United States Patent
Zhang et al.

(10) Patent No.: US 11,544,539 B2
(45) Date of Patent: Jan. 3, 2023

(54) HARDWARE NEURAL NETWORK CONVERSION METHOD, COMPUTING DEVICE, COMPILING METHOD AND NEURAL NETWORK SOFTWARE AND HARDWARE COLLABORATION SYSTEM

(71) Applicant: Tsinghua University, Beijing (CN)

(72) Inventors: Youhui Zhang, Beijing (CN); Yu Ji, Beijing (CN)

(73) Assignee: Tsinghua University, Beijing (CN)

( * ) Notice: Subject to any disclaimer, the term of this patent is extended or adjusted under 35 U.S.C. 154(b) by 950 days.

(21) Appl. No.: 16/337,981

(22) PCT Filed: Sep. 29, 2016

(86) PCT No.: PCT/CN2016/100783
§ 371 (c)(1),
(2) Date: Mar. 29, 2019

(87) PCT Pub. No.: WO2018/058426
PCT Pub. Date: Apr. 5, 2018

(65) Prior Publication Data
US 2020/0026992 A1    Jan. 23, 2020

(51) Int. Cl.
*G06N 3/063* (2006.01)
*G06N 3/04* (2006.01)
(Continued)

(52) U.S. Cl.
CPC ........... *G06N 3/063* (2013.01); *G06F 17/16* (2013.01); *G06N 3/0454* (2013.01); *G06N 3/084* (2013.01)

(58) Field of Classification Search
CPC ....... G06N 3/063; G06N 3/0454; G06N 3/084
See application file for complete search history.

(56) References Cited

U.S. PATENT DOCUMENTS 6,480,621 B1 * 11/2002 Lyon .................... G06K 9/6256
382/161
7,814,038 B1 * 10/2010 Repici ...................... G06N 3/08
706/25
(Continued)

FOREIGN PATENT DOCUMENTS

| CN | 101527010 A | 9/2009 |
| CN | 104112053 A | 10/2014 |
| CN | 105956660 A | 9/2016 |

OTHER PUBLICATIONS

Mariet et al., "Diversity Networks," 2016, arXiv:1511.05077v5 [cs. LG], 12 pages (Year: 2016).*
(Continued)

*Primary Examiner* — Abdullah Al Kawsar
*Assistant Examiner* — Asher H. Jablon
(74) *Attorney, Agent, or Firm* — Olive Law Group, PLLC

(57) ABSTRACT

A hardware neural network conversion method, a computing device, a compiling method and a neural network software and hardware collaboration system for converting a neural network application into a hardware neural network fulfilling a hardware constraint condition are disclosed. The method comprises: obtaining a neural network connection diagram corresponding to the neural network application; splitting the neural network connection diagram into neural network basic units; converting each of the neural network basic units so as to form a network having equivalent functions thereto and formed by connecting basic module virtual entities of neural network hardware; and connecting the obtained basic unit hardware network according to the sequence of splitting so as to create a parameter file for the hardware neural network. The present disclosure provides a novel neural network and a brain-like computing software and hardware system.

13 Claims, 7 Drawing Sheets

(51) Int. Cl.
*G06N 3/08* (2006.01)
*G06F 17/16* (2006.01)

(56) References Cited

U.S. PATENT DOCUMENTS

| | | | |
|---|---|---|---|
| 9,183,030 B2* | 11/2015 | Nicholas | G06F 9/45558 |
| 9,275,328 B1* | 3/2016 | Minkovich | G06N 3/088 |
| 10,614,354 B2* | 4/2020 | Aydonat | G06N 3/0454 |
| 2014/0067741 A1 | 3/2014 | Katayama et al. | |
| 2016/0125289 A1* | 5/2016 | Amir | G06N 3/088 |
| | | | 706/27 |
| 2016/0127405 A1* | 5/2016 | Kasahara | G06N 3/0454 |
| | | | 726/23 |
| 2017/0116157 A1* | 4/2017 | Fong | G06F 17/16 |
| 2017/0116498 A1* | 4/2017 | Raveane | G06K 9/6257 |
| 2017/0228646 A1* | 8/2017 | O'Connor | G06F 11/079 |

OTHER PUBLICATIONS

International Search Report and Written Opinion for PCT/CN2016/100783 dated May 31, 2017.

* cited by examiner

300

400

(a)

(b)

(c)

HARDWARE NEURAL NETWORK CONVERSION METHOD, COMPUTING DEVICE, COMPILING METHOD AND NEURAL NETWORK SOFTWARE AND HARDWARE COLLABORATION SYSTEM

CROSS REFERENCE TO RELATED APPLICATION

This application is a 35 USC 371 application of International PCT Patent Application No. PCT/CN2016/100783, filed on Sep. 29, 2016; the content of which is hereby incorporated by reference herein in its entirety.

TECHNICAL FIELD

The present disclosure generally relates to a neural network technical field, and more particularly, to a technology of implementing a software neural network with a neural network chip.

BACKGROUND

In recent years, a deep learning technology has made a breakthrough progress, and has achieved a very high precision rate in image recognition, speech recognition, natural language processing and many other fields; however, deep learning requires massive computing resources, and it is very difficult for a traditional general-purpose processor to fulfill computing requirements of deep learning, so hardware conversion of deep learning and its application specific integrated circuit (ASIC) design have become an important direction of development. Meanwhile, with development of brain science, because a brain has characteristics such as ultra-low power consumption, and high error tolerance as compared with a traditional von Neumann computer, and has significant advantages in processing unstructured information and intelligent tasks, drawing on a computing mode of the brain to construct a novel brain-like computing system and a brain-like computing chip has become an emerging development direction.

Whether it is deep learning or brain-like computing, the underlying computing model is a Neural Network (NN); the two differ from each other mainly in that: the deep learning mainly uses an Artificial Neural Network (ANN), while the brain-like computing mainly uses a Spiking Neural Network (SNN); and both take a neuron as a basic component unit, with a large number of neurons interconnected to form a network. A connection between neurons may be considered as a weighted directed edge, an output of a neuron is weighted by a connection between neurons, and then transmitted to a neuron connected therewith, and all inputs received by each neuron will be accumulated for further processing, to generate an output of the neuron. The ANN and the SNN differ from each other mainly that: a neuron of the ANN outputs a numerical value, which is multiplied by an edge weight for weighting, while a neuron of the SNN outputs electric pulse signals one by one, which are weighted to form current signals of different intensities; with respect to an input of any other neuron, the neuron of the ANN will directly calculate an output value of the neuron through an activation function, while the neuron of the SNN, when receiving a current signal input by any other neuron, will update its state according to its neuron model, discharge an electrical pulse when a certain state is reached, and reset the state.

The neural network is usually modeled with a plurality of neurons as a layer, with layers interconnected; FIG. 10 shows a chain-like neural network, in which each circle represents one neuron, each arrow indicates a connection between neurons, and each connection has a weight; however, a structure of an actual neural network is not limited to the chain-like network structure.

A core computation of the neural network is a matrix vector multiplication operation, wherein, an output generated by layer $L_n$ including n neurons may be represented by vector $V_n$ with a length of n, the layer is in full connection with layer $L_m$ including m neurons, a connection weight may be expressed as a matrix $M_{n \times m}$, the matrix has a size of n rows and m columns, and each matrix element represents a weight of one connection. Then, a vector input into $L_m$ after weighting is $M_{n \times m} V_n$, and such a matrix vector multiplication is the most core computation of the neural network.

Because the matrix vector multiplication is extraordinarily complex, and plenty of time has to be spent doing a large amount of matrix multiplications on a traditional general-purpose processor, a neural network acceleration chip and a brain-like chip both take an accelerated matrix multiplication as a main design objective; in specific implementation, a matrix vector multiplication module of a certain size (for example, a basic module for multiplying a matrix with a size of 256×256 by a vector with a length of 256) is usually implemented by hardware, and then basic modules are connected by using network on chip (NoC) and other technologies. Through hardware conversion of the matrix vector multiplication, an operational speed may be greatly improved.

However, hardware conversion also constrains freedom of a neural network application it may support, which also poses an important issue that: it is difficult to run an actual neural network application with such a chip. Although the neural network chip may efficiently perform matrix vector multiplications, there are still significant differences between the neural network application and the underlying chip, for example:

(1) A neural network hardware basic module is usually a fixed-size matrix vector multiplication, while a size of a matrix operation in the actual neural network application is arbitrary.

(2) The neural network application usually computes with a 32-bit floating point number, while hardware is sometimes designed to have a lower precision, and even to compute with an integer in order to increase efficiency.

(3) An activation function (with respect to the ANN) or a neuron model (with respect to the SNN) of the neural network hardware is usually fixed, while an activation function or a neuron model of the neural network application is usually very flexible, and new activation functions and neuron models will be constantly brought into the neural network application.

Hereinafter, an overview of hardware chip series in the prior art is provided.

1. Technical Solution I in the Prior Art: Cambrian Chip Series 1 (1) Technical Solution I in the Prior Art A computing core of the Cambrian chip implements a matrix vector multiplication with a size of 16×16 and a nonlinear activation function through a high-speed three-stage pipeline, the chip is further configured with three dedicated storage modules, which are respectively used for storing input data, output data and weight data, and the data is retrieved from an on-chip storage module by a controller and sent to the computing core for computation. With respect to an operation of a matrix with larger size of, for example, 32, it is split into 4 matrices, each with a size of 16×16, according to the technical solution, which are sequentially loaded into the computing core by the controller to complete computation, and finally computation results are accumulated and combined. A neural network of an arbitrary size is supported through multiplexing the computing core in a time division manner. On the other hand, in a third-stage pipeline step of the Cambrian chip computing core, various common activation functions are provided to support the vast majority of neural network applications.

1 (2). Disadvantages of the Technical Solution I in the Prior Art

In the Cambrian chip approach, the weight of the neural network is separated from the computing core, and time division multiplexing of computing resources and access to a memory is controlled through software. Since the method still separates computation from storage, it is essentially a customized solution under the von Neumann architecture, such that weight data still has to be transmitted back and forth between a computing unit and a storage unit, and it is still subjected to a Von Neumann bottleneck. Although the Cambrian chip has made great effort in improving a bandwidth between the computing core and the storage unit, yet as the size of the neural network application increases, access to the weight data will eventually become a system bottleneck.

In addition, due to relatively large overhead of computational logic and on-chip storage, chip integration cannot reach a very high level, and the number of computing cores integrated on each chip is very limited.

2. Technical Solution II in the Prior Art Related to the Present Disclosure: TrueNorth Chip 2 (1). The Technical Solution II in Prior Art TrueNorth is IBM's neuromorphic chip, each chip has 4096 synaptic nuclei integrated thereon, and each synaptic nucleus may process 256 synaptic computations (i.e., matrix vector multiplications). In order to improve an integration level, TrueNorth's synaptic nucleus has been greatly streamlined, wherein, a very simple leaky integrate-and-fire (LIF) neuron model (a commonly used SNN neuron model) is applied, a weight is also greatly compressed, each neuron may have up to 256 input synapses, and there are only 3 optional values for weights of the 256 input synapses.

In order to apply TrueNorth to run the actual neural network, IBM has designed a set of Corelet language to program TrueNorth, which decomposes a large task into connections between small tasks in a stepwise manner, so that a smallest task is just on a synaptic nucleus. Corelet has various hardware constraints exposed to an application layer, so that constraints of TrueNorth hardware itself have to be considered during neural network design.

2 (2). Disadvantages of the Technical Solution II in the Prior Art

In the TrueNorth chip design, in order to improve the integration level of the chip, more synaptic nuclei are placed within a limited area, and the synaptic nuclei of the TrueNorth chip has a strong constraint on the neural network. Therefore, it is very difficult to run the existing neural network application on the TrueNorth chip; with respect to various intelligent tasks, it is necessary to redesign and train a neural network dedicated to the TrueNorth chip, and due to the hardware constraints on the application layer, currently it is very difficult for the redesigned and trained neural network dedicated to TrueNorth to achieve a precision rate comparable to the most advanced neural network at present in image recognition and other fields.

3. Technical Solution III in the Prior Art Related to the Present Disclosure: A Novel Device—Memristor 3 (1). Technical Solution III in the Prior Art The memristor is a novel semiconductor device, whose resistance value may be changed at a specific input current. The resistance value of the memristor may be used for storing data; as compared with traditional Dynamic Random Access Memory (DRAM) and Static Random Access Memory (SRAM), it has a characteristic of high storage density; and since its data is stored through the resistance value, data will not be lost even when power supply fails. In addition, the memristor may also perform computation, which is an ideal device for integrating computation and storage.

FIG. 11 shows a structural schematic diagram of a crossbar based on the memristor.

As shown in FIG. 11, by arranging lines into the crossbar and connecting them at intersection points with memristors, setting a conductance value (a reciprocal of a resistance) of the memristor to a matrix element value of a weight matrix, and inputting a voltage value at an input end, the matrix vector multiplication may be completed at an output end. Based on such a basic unit, a neuromorphic chip based on a novel device may be constructed. Due to its characteristics of high integration level and integration of computation and storage, it does not have to transmit weight data back and forth, and has great potential in constructing a large-size neuromorphic chip.

3 (2). Disadvantages of the Technical Solution III

Since computation of the memristor is based on an analog circuit, precision its analog signal may achieve is limited, and a value range of the weight also depends on a resistance change range of the memristor. In addition, it is also constrained by connectivity just as TrueNorth, and it is still difficult to directly run the existing neural network applied thereto.

To sum up, the technical solution I in the prior art, the Cambrian chip, is dedicated to adapting the chip to the demand of the neural network application, so that the chip can support a neural network of an arbitrary size in a time division multiplexing manner, and support the existing neural network through a built-in common activation function. On the one hand, due to its characteristic of separation of storage from computation, it is always subjected to the Von Neumann bottleneck, and as the application size increases, its efficiency will be limited by the transmission bandwidth between storage and computation; on the other hand, because the commonly used activation function is fixed thereby, with development of the neural network application technology, new activation functions and neuron models require the chip to constantly adapt to the development of the application and make corresponding modifications; moreover, due to its high degree of freedom, the logic is relatively complex logic, and cannot achieve a very high integration level. The technical solution II in prior art, TrueNorth, is dedicated to adapting the application to the neural network chip, while the underlying chip is dedicated to improving integration and efficiency, to reduce power consumption. The neuron model it supports is streamlined, so that millions of neurons are inherited within a very small chip area with very low power consumption. In addition, it may be combined with the technical solution III, to further improve the integration level with novel devices and processes. However, the category of solutions poses too many constraints on the application, so they cannot be well combined with the existing application, and may hardly achieve an effect equivalent to that of the most advanced neural network at present on complex tasks.

It may be seen that, the existing neural network hardware is usually directly connected with the neural network application, resulting in either an issue that the hardware is too simple, which restrains the freedom degree of the application, or an issue that the hardware has a high freedom degree, which is relatively complicated, so that it is difficult to improve integration and efficiency.

A more universal all-purpose technology which applies an arbitrary neural network application to an arbitrary neural network chip is required.

SUMMARY

The present disclosure has been made in view of the above-described circumstances.

According to one aspect of the present disclosure, there is provided a hardware neural network conversion method for converting a neural network application into a hardware neural network fulfilling a hardware constraint condition, which may comprise: a neural network connection diagram obtaining step of obtaining a neural network connection diagram corresponding to the neural network application, wherein, the neural network connection diagram is a directed diagram, each node in the diagram represents a layer of neurons, and each edge represents an inter-layer connection relationship; a neural network connection diagram splitting step of splitting the neural network connection diagram into neural network basic units, wherein, each neural network basic unit has only ingress nodes and egress nodes without any intermediate layer node, the ingress nodes are in full connection with the egress nodes, all fan-outs of each neuron in the ingress node are within the basic unit, and all fan-ins of each neuron in the egress node are within the basic unit; a neural network basic unit conversion step of converting each of the neural network basic units so as to form a network having equivalent functions thereto and formed by connecting basic module virtual entities of neural network hardware, which is referred to as a basic unit hardware network, wherein, one neural network basic unit corresponds to one or more basic module virtual entities of the neural network hardware, and each basic module virtual entity of the neural network hardware fulfills a connectivity constraint condition of a neural network hardware basic module, and is capable of being directly mapped to the neural network hardware basic module; and a basic unit hardware network connection step of connecting the obtained basic unit hardware networks according to the sequence of splitting so as to create a parameter file for the hardware neural network.

The above-described hardware neural network conversion method, may further comprise: in a case where the neural network application has a convolution layer, before the neural network connection diagram splitting step, performing network compression on the convolution layer of the neural network application; and the network compression operation may include: obtaining a plurality of feature maps of each convolution layer; taking similarity between outputs generated by the feature maps on all samples as a DPP algorithm-associated matrix element by using a DPP method for extracting a diversity subset, obtaining a highest diversity subset by using the DPP, reserving the subset, discarding other feature map nodes, projecting a vector corresponding to the discarded feature map into a linear space spanned by the reserved feature map, taking a ratio of a projection length of the discarded feature map to its original vector length as a weighting coefficient, and accumulating a connection weight between the discarded feature map and a next layer of neurons in a weighted manner onto a connection weight between the reserved feature map and the next layer of neurons.

According to the above-described hardware neural network conversion method, the neural network basic unit conversion step includes: reconstructing a network topology for each neural network basic unit; and determining a weight parameter for the reconstructed network topology.

According to the above-described hardware neural network conversion method, the reconstructing a network topology includes a fully expanded operation; after fully expansion, the neural network basic unit is decomposed into interconnections between basic module virtual entities; and the fully expanded operation includes: in a case where a first-size matrix multiplication and/or a large matrix convolution operation associated with the neural network basic unit exceeds a second-size small matrix operation supported by the neural network hardware basic module, executing operations below: splitting the first-size large matrix operation into the third number of second-size small matrix operations, each small matrix operation being completed by one basic module virtual entity; decomposing input data for the first-size large matrix operation into the third number of copies, and transmitting the same to the third number of second-size small matrix operations, which is a multicast operation; aggregating operation results from the third number of second-size small matrix operations to be equivalent to an operation result of the first-size large matrix operation, which is a reduction operation; in a case that the neural network hardware chip has a first additional module supporting the multicast operation, assigning the multicast operation to be executed by the first additional module virtual entity, otherwise, completing the multicast operation by a first set of basic module virtual entities; in a case that the neural network hardware chip has a second additional module supporting the reduction operation, assigning the reduction operation to be executed by the second additional module virtual entity, otherwise, completing the reduction operation by a second set of basic module virtual entities.

According to the above-described hardware neural network conversion method, in a case where the number of basic modules on the neural network hardware chip is insufficient, the basic module is multiplexed in a time division manner.

According to the above-described hardware neural network conversion method, the reconstructing a network topology, before the fully expanded operation, further includes a recoding operation, which may include: recoding inter-layer data with an autoencoder, wherein, the autoencoder is a neural network, consisting of three layers of neurons, including an input layer, a hidden layer and an output layer, the number of nodes of the output layer is equal to the number of nodes of the input layer, and the number of nodes of the hidden layer is greater than dimensionality of inter-layer vector data; training the network, so that a value of the output layer is as approximate to a value of the input layer as possible, wherein, precision of the input layer and the output layer is precision of the neural network application, and precision of the hidden layer is precision of data transmitted between the neural network hardware basic modules; converting the autoencoder into a combination of an encoder and a decoder; and forming a connection matrix by combining a decoder of an input node, a weight matrix of an original connection, and an encoder of an output node, with respect to an expression that an inter-layer vector transmitted from a Kth layer to a (K+1)th layer is a hidden layer of the autoencoder used in the kth layer.

The above-described hardware neural network conversion method, in a case where there is a special function in the neural network application and the neural network hardware chip does not support the special function, before the fully expanded operation, further comprises: constructing a specialized neural network for the special function.

According to the above-described hardware neural network conversion method, the determining a weight parameter for the reconstructed network topology includes: initializing a weight of the network obtained by reconstructing the network topology, according to the weight of the original neural network; and performing fine adjustment on the weight parameter such that the weight fulfills a hardware weight constraint. According to the above-described hardware neural network conversion method, the performing fine adjustment on a weight parameter such that the weight fulfills a hardware weight constraint includes: (1) firstly, expressing the weight with floating point precision, and retraining the constructed network, so that an error from the original network is as small as possible; (2) in a case where the neural network hardware chip has a configurable parameter P, determining a best P and by using an EM algorithm, according to the parameter obtained in the training of step (1), expressing all weight parameters as a function of P, and retraining to adjust P, where P is a configurable parameter of hardware abstraction, and $k_{ij}$ is an index of values of respective matrix elements in a set $S^P$; (3) in a case where weight precision of the neural network hardware chip is lower than a predetermined threshold, fixing P obtained in the training of step (2), initializing all weights to corresponding $S_{k_{ij}}^P$, retraining to adjusts $k_{ij}$, storing all the weights with floating point precision, but rounding all the weight parameters to a most approximate value in $S^P$ in a feedforward process of the training, then bringing into feedforward computation, while feeding back and updating the weights still with floating point precision, and updating the weight values of floating point precision, where, a value range of a weight matrix W of the neural network hardware basic module is considered as a set $S^P$, each element in the set is a function of parameter P, where P is a hardware configurable parameter, each element $W_{ij}$ in the weight matrix may be independently selected from $S^P$, that is, an index $k_{ij}$ is capable of being independently configured such that $W_{ij}=S_{k_{ij}}^P$, so what the weight matrix W is capable of configuring is a set parameter P and index $k_{ij}$ of values of respective weights in the set.

According to the above-described hardware neural network conversion method, the converting each of the neural network basic units so as to form a network having equivalent functions thereto and formed by connecting basic module virtual entities of neural network hardware may include: in a case where the neural network connection diagram is a directed acyclic diagram, converting the respective neural network basic units one by one, in a topological order of the neural network connection diagram; in a case where the neural network connection diagram is a cyclic directed diagram, firstly breaking a cycle of the cyclic directed diagram, so that the neural network connection diagram is changed into a directed acyclic diagram, then converting the respective neural network basic units one by one, in a topological order of the directed acyclic diagram; and training the respective converted neural network basic units in the topological order, sources of training data required for retraining being that: training input data is an output generated by a training sample having undergone a topological order-preceded basic unit hardware network, and training output label is an output generated by the training sample in a corresponding layer of the original neural network application.

According to the above-described hardware neural network conversion method, when the neural network application is an SNN, the training data used in the neural network basic unit conversion step is obtained as follows: taking an electrical pulse of a stable frequency as an input with respect to the original network, recording electrical pulse discharge frequencies of respective neurons, and taking the same as the training data used in the neural network basic unit conversion step.

According to the above-described hardware neural network conversion method, when a neural network involved in the neural network hardware chip is of an SNN type, a functional relation of the SNN on the pulse discharge frequency is derived according to a neuron model of the SNN, and based on that the functional relation is continuous and derivable, training is performed by using a back-propagation algorithm.

According to another aspect of the present disclosure, there is provided a computing device, for converting a neural network application into a hardware neural network fulfilling a hardware constraint condition, comprising a memory and a processor, the memory having computer-executable instructions stored therein, and when executing the computer-executable instructions, the processor executing a method below: a neural network connection diagram obtaining step of obtaining a neural network connection diagram corresponding to the neural network application, wherein, the neural network connection diagram is a directed diagram, each node in the diagram represents a layer of neurons, and each edge represents an inter-layer connection relationship; a neural network connection diagram splitting step of splitting the neural network connection diagram into neural network basic units, wherein, each neural network basic unit has only ingress nodes and egress nodes without any intermediate layer node, the ingress nodes are in full connection with the egress nodes, all fan-outs of each neuron in the ingress node are within the basic unit, and all fan-ins of each neuron in the egress node are within the basic unit; a neural network basic unit conversion step of converting each of the neural network basic units so as to form a network having equivalent functions thereto and formed by connecting basic module virtual entities of neural network hardware, which is referred to as a basic unit hardware network, wherein, one neural network basic unit corresponds to one or more basic module virtual entities of the neural network hardware, and each basic module virtual entity of the neural network hardware fulfills a connectivity constraint condition of a neural network hardware basic module, and is capable of being directly mapped to the neural network hardware basic module; and a basic unit hardware network connection step of connecting the obtained basic unit hardware networks according to the sequence of splitting so as to create a parameter file for the hardware neural network.

According to the above-described computing device, the method executed further comprises: in a case where the neural network application has a convolution layer, before the neural network connection diagram splitting step, performing network compression on the convolution layer of the neural network application, including: obtaining a plurality of feature maps of each convolution layer; taking similarity between outputs generated by the feature maps on all samples as a DPP algorithm-associated matrix element by using a DPP method for extracting a diversity subset, obtaining a highest diversity subset by using the DPP, reserving the subset, discarding other feature map nodes, projecting a vector corresponding to the discarded feature map into a linear space spanned by the reserved feature map, taking a ratio of a projection length of the discarded feature map to its original vector length as a weighting coefficient, and accumulating a connection weight between the discarded feature map and a next layer of neurons in a weighted manner onto a connection weight between the reserved feature map and the next layer of neurons.

According to the above-described computing device, the neural network basic unit conversion step may include: reconstructing a network topology for each neural network basic unit; and determining a weight parameter for the reconstructed network topology.

According to the above-described computing device, the reconstructing a network topology includes a fully expanded operation; after fully expansion, the neural network basic unit is decomposed into interconnections between basic module virtual entities; and the fully expanded operation includes:

In a case where a first-size matrix multiplication and/or a large matrix convolution operation associated with the neural network basic unit exceeds a second-size small matrix operation supported by the neural network hardware basic module, executing operations below: splitting the first-size large matrix operation into the third number of second-size small matrix operations, each small matrix operation being completed by one basic module virtual entity; decomposing input data for the first-size large matrix operation into the third number of copies, and transmitting the same to the third number of second-size small matrix operations, which is a multicast operation; aggregating operation results from the third number of second-size small matrix operations to be equivalent to an operation result of the first-size large matrix operation, which is a reduction operation; in a case that the neural network hardware chip has a first additional module supporting the multicast operation, assigning the multicast operation to be executed by the first additional module virtual entity, otherwise, completing the multicast operation by a first set of basic module virtual entities; in a case that the neural network hardware chip has a second additional module supporting the reduction operation, assigning the reduction operation to be executed by the second additional module virtual entity, otherwise, completing the multicast operation by a second set of basic module virtual entities.

According to the above-described computing device, in a case where the number of basic modules on the neural network hardware chip is insufficient, the basic module is multiplexed in a time division manner.

According to the above-described computing device, the reconstructing a network topology, before the fully expanded operation, further includes a recoding operation, including: recoding inter-layer data with an autoencoder, wherein, the autoencoder is a neural network, consisting of three layers of neurons, including an input layer, a hidden layer and an output layer, the number of nodes of the output layer is equal to the number of nodes of the input layer, and the number of nodes of the hidden layer is greater than dimensionality of inter-layer vector data; training the network, so that a value of the output layer is as approximate to a value of the input layer as possible, wherein, precision of the input layer and the output layer is precision of the neural network application, and precision of the hidden layer is precision of data transmitted between the neural network hardware basic modules; converting the autoencoder into a combination of an encoder and a decoder; and forming a connection matrix by combining a decoder of an input node, a weight matrix of an original connection, and an encoder of an output node, with respect to an expression that an inter-layer vector transmitted from a Kth layer to a (K+1)th layer is a hidden layer of the autoencoder used in the kth layer.

According to the above-described computing device, in a case where there is a special function in the neural network application and the neural network hardware chip does not support the special function, before the fully expanded operation, the method further comprises: constructing a specialized neural network for the special function.

According to the above-described computing device, the determining a weight parameter for the reconstructed network topology includes: initializing a weight of the network obtained by reconstructing the network topology, according to the weight of the original neural network; and performing fine adjustment on the weight parameter such that the weight fulfills a hardware weight constraint.

According to the above-described computing device, the performing fine adjustment on a weight parameter such that the weight fulfills a hardware weight constraint includes: (1) firstly, expressing the weight with floating point precision, and retraining the constructed network, so that an error from the original network is as small as possible; (2) in a case where the neural network hardware chip has a configurable parameter P, determining a best P and $k_{ij}$ by using an EM algorithm, according to the parameter obtained in the training of step (1), expressing all weight parameters as a function of P, and retraining to adjust P, where P is a configurable parameter of hardware abstraction, and $k_{ij}$ is an index of values of respective matrix elements in a set $S^P$; (3) in a case where weight precision of the neural network hardware chip is lower than a predetermined threshold, fixing P obtained in the training of step (2), initializing all weights to corresponding $S_{k_{ij}}^P$, retraining to adjust $k_{ij}$, storing all the weights with floating point precision, but rounding all the weight parameters to a most approximate value in $S^P$ in a feedforward process of the training, then bringing into feedforward computation, while feeding back and updating the weights still with floating point precision, and updating the weight values of floating point precision, where, a value range of a weight matrix $W_{ij}$ of the neural network hardware basic module is considered as a set $S^P$ each element in the set is a function of parameter P, where P is a hardware configurable parameter, each element $W_{ij}$ in the weight matrix is capable of being independently selected from that is $S^P$, an index $k_{ij}$ is capable of being independently configured such that $W_{ij}=S_{k_{ij}}^P$, so what the weight matrix W is capable of configuring is a set parameter P and an index $k_{ij}$ of values of respective weights in the set.

According to the above-described computing device, the converting each of the neural network basic units so as to form a network having equivalent functions thereto and formed by connecting basic module virtual entities of neural network hardware includes: in a case where the neural network connection diagram is a directed acyclic diagram, converting the respective neural network basic units one by one, in a topological order of the neural network connection diagram; in a case where the neural network connection diagram is a cyclic directed diagram, firstly breaking a cycle of the cyclic directed diagram, so that the neural network connection diagram is changed into a directed acyclic diagram, then converting the respective neural network basic units one by one, in a topological order of the directed acyclic diagram; and training the respective converted neural network basic units in the topological order, sources of training data required for retraining being that: training input data is an output generated by a training sample having undergone a topological order-preceded basic unit hardware network, and training output label is an output generated by the training sample in a corresponding layer of the original neural network application.

According to the above-described computing device, when the neural network application is an SNN, the training data used in the neural network basic unit conversion step is obtained as follows: taking an electrical pulse of a stable frequency as an input with respect to the original network, recording electrical pulse discharge frequencies of respective neurons, and taking the same as the training data used in the neural network basic unit conversion step.

According to the above-described computing device, when a neural network involved in the neural network hardware chip is of an SNN type, a functional relation of the SNN on the pulse discharge frequency is derived according to a neuron model of the SNN, and based on that the functional relation is continuous and derivable, training is performed by using a back-propagation algorithm.

According to still another aspect of the present disclosure, there is provided a compiling method for compiling a neural network software application into a hardware neural network, which may comprise: obtaining a neural network software application and a neural network hardware chip configuration situation; converting the neural network software application into the hardware neural network, based on the neural network hardware configuration situation, the hardware neural network being formed by connecting basic modules of the neural network hardware chip; and outputting a parameter file for the hardware neural network, the parameter file describing a connection relationship between the basic modules and a parameter configuration situation of respective basic modules.

According to a further aspect of the present disclosure, there is provided a neural network software and hardware collaboration system, which may comprise: a neural network hardware chip, wherein, the neural network hardware chip has a basic module thereon, the basic module executes a matrix vector multiplication and an activation function operation in a form of hardware, and a parameter of the basic module on the neural network hardware chip and a connection between basic modules may be configured by a configuration file of a determined format; a compiling layer unit, configured to compile a neural network application into a parameter file for a hardware neural network, wherein, the hardware neural network may be mapped to one or more neural network hardware chips based on the parameter file, and the one or more mapped neural network hardware chips are capable of running a function of the neural network application.

According to the above-described neural network software and hardware collaboration system, the compiling layer unit is configured to execute a method below: a hardware configuration data obtaining step of obtaining configuration situation data of the neural network hardware chip; a neural network connection diagram obtaining step of obtaining a neural network connection diagram corresponding to the neural network application, wherein, the neural network connection diagram is a directed diagram, each node in the diagram represents a layer of neurons, and each edge represents an inter-layer connection relationship; a neural network connection diagram splitting step of splitting the neural network connection diagram into neural network basic units, wherein, each neural network basic unit has only ingress nodes and egress nodes without any intermediate layer node, the ingress nodes are in full connection with the egress nodes, all fan-outs of each neuron in the ingress node are within the basic unit, and all fan-ins of each neuron in the egress node are within the basic unit; a neural network basic unit conversion step of converting each of the neural network basic units so as to form a network having equivalent functions thereto and formed by connecting basic module virtual entities of neural network hardware, which is referred to as a basic unit hardware network, wherein, one neural network basic unit corresponds to one or more basic module virtual entities of the neural network hardware, and each basic module virtual entity of the neural network hardware fulfills a connectivity constraint condition of a neural network hardware basic module, and is capable of being directly mapped to the neural network hardware basic module; and a basic unit hardware network connection step of connecting the obtained basic unit hardware networks according to the sequence of splitting so as to create a parameter file for the hardware neural network.

The present disclosure provides a novel neural network and a brain-like computing software and hardware system.

As described above, the existing technical route is, without exception, to directly adapt the neural network application to the chip: either directly adapt the chip to the freedom degree of the application, which brings a performance bottleneck; or expose the chip constraint to the application, which constrains capabilities of the application. In contrast, in the hardware neural network conversion method according to the embodiment of the present disclosure, the addition of an intermediate layer between the neural network application and the neural network chip resolves the issue of adaptation between the neural network application and the neural network application chip by means equivalent to a compiling technology in the traditional computer system, and at a same time, decouples applications from chip development.

In addition, in the hardware neural network conversion method according to the embodiment of the present disclosure, with respect to an arbitrary complex neural network and arbitrary hardware fulfilling hardware abstraction, there is provided a universal process, which may convert the complex neural network into a specific network fulfilling the hardware constraint condition, and having substantially equivalent functions to the original network. The core of the process is to decompose the complex network; since an operation executed by each basic unit is relatively simple, the conversion process may be more securely converged than direct conversion of the entire network, with a faster convergence speed.

Moreover, in the hardware neural network conversion method according to the embodiment of the present disclosure, the nodes in the neural network connection diagram are grouped, and the neural network is split into a plurality of basic units, so that ingress edges or egress edges of an arbitrary node within the basic unit are all within the basic unit, and thus, after the issue of connectivity is resolved within the basic unit, the converted basic units are reconnected, and the obtained network still can fulfill the connectivity requirement.

In addition, in one example as described above, modules are converted one by one in the topological order, and the previously generated error is introduced into subsequent fine adjustment, so that the error introduced by conversion of the respective basic modules will not be accumulated layer by layer.

In addition, in one example, in a case where the neural network application has a convolution layer, before the neural network connection diagram splitting step, network compression may be performed on the convolution layer of the neural network application, so as to reduce a network size, and save hardware resources.

BRIEF DESCRIPTION OF THE DRAWINGS

These and/or other aspects and advantages of the present disclosure will become more apparent and more comprehensible, from the following detailed description of embodiments of the present disclosure in conjunction with the accompanying drawings, in which.

DETAILED DESCRIPTION

Figure 1:
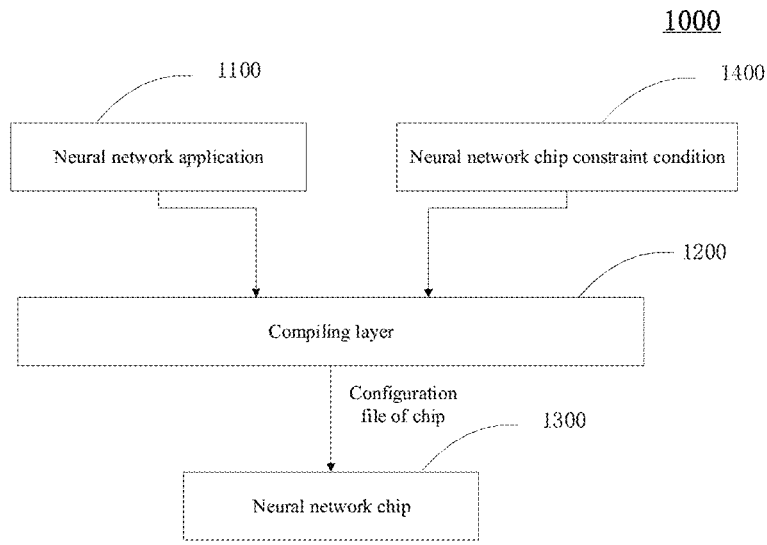
FIG. 1 shows a schematic diagram of an application context 1000 of a hardware neural network conversion technology according to an embodiment of the present disclosure.

In order that those skilled in the art better understand the present disclosure, it will be further described in detail below in conjunction with accompanying drawings and specific implementation modes.

Before the respective embodiments are described in detail, terms used herein are explained.

Hardware neural network: it refers to a neural network fulfilling a hardware constraint condition.

Neural network hardware chip: it refers to a chip that takes a neural network as a target application.

Neural network connection diagram: a neural network connection diagram is a directed diagram, each node in the diagram represents a layer of neurons, and each edge represents an inter-layer connection relationship; in a case of an ANN neural network application, a corresponding neural network connection diagram is an acyclic directed diagram, and in a case of an SNN neural network application, a corresponding neural network connection diagram is a directed cyclic diagram.

Neural network basic unit: each neural network basic unit has only ingress nodes and egress nodes without any intermediate layer node, the ingress nodes are in full connection with the egress nodes, all fan-outs of each neuron in the ingress node are within the basic unit, and all fan-ins of each neuron in the egress node are within the basic unit.

Neural network hardware chip: it is connected by a large number of physical cores through an interconnection system, may have various topologies, and may accept certain configuration.

Physical core: it is a neural network hardware basic module consisting of a matrix vector multiplication+an activation function, and plays a role in receiving an input, performing matrix weighting firstly, and then generating an output through the activation function.

Parameter file for hardware neural network: it includes information describing a parameter of a virtual core and a connection relationship between virtual cores, wherein, the parameter of the virtual core includes, for example, a connection matrix, and the like.

Virtual core: a virtual core corresponds to the physical core, and is an abstraction of the physical core; herein, it refers to each and every one hardware basic module virtual entity in a connection diagram finally obtained by using an algorithm. After the conversion algorithm ends, a bunch of virtual cores and a connection relationship therebetween are obtained, and then the virtual cores are distributed onto the physical cores of the neural network hardware chip through a mapping algorithm.

Mapping: a process of distributing the virtual cores onto the physical cores.

Connectivity constraint: each neural network hardware basic module may only support a fixed-size matrix operation, so an fan-in of a neuron should not exceed the number of inputs of the hardware basic module, and an fan-out of a neuron should not exceed an fan-out of the hardware basic module. Another point is that, a connection between hardware basic modules only supports one-to-one connection, that is, one output of the hardware basic module may only be sent to an input of one other hardware basic module, which is also a connectivity constraint; however, not all neural network hardware is subjected to the constraint.

The present disclosure provides an idea of introducing an intermediate layer between the hardware and the application, and provides a universal method and process for transparently converting and adapting an arbitrary neural network (regardless whether an ANN or an SNN) to an arbitrary neural network chip, which is similar to a role of a compiler in a traditional computer system. In the present disclosure, development of the neural network application may be decoupled from research and development of the neural network chip, so that the hardware may be made simple enough, dedicated to improving efficiency and integration, while capable of supporting any neural network application.

Target hardware herein refers to a variety of neural network accelerators and brain-like computing chips. These chips usually consist of a plurality of processing cores, each processing core may accept M inputs, which are subjected to a matrix vector multiplication with an M×N matrix, resulting in results, which undergo a hardware built-in activation function or a built-in hardware neuron model, resulting in final N outputs. The target hardware consists of a large number of such processing cores, and the processing cores may communicate with one another. The hardware neural network conversion technology (the compiling layer 1200 in FIG. 1) according to the present disclosure only requires that each output of the processing core may be sent to a certain input of other processing core.

FIG. 1 shows a schematic diagram of an application context 1000 of a hardware neural network conversion technology according to an embodiment of the present disclosure.

As shown in FIG. 1, the present disclosure contributes to providing a compiling layer 1200 between a neural network application 1100 and a neural network chip 1300. The compiling layer 1200 converts the neural network application into a network having equivalent functions thereto while fulfilling a hardware constraint condition 1400, which is manifested as a parameter file for the hardware neural network. Based on the parameter file, a certain mapping algorithm may be used subsequently for mapping the hardware neural network onto the neural network hardware, so that the mapped neural network hardware is capable of running a function of the neural network application. The conversion performed by the compiling layer 1200 is transparent to an application developer. It is referred to as the compiling layer because its function and effect are similar to those of a compiler that converts an advanced programming language into a binary executable program (or assembly language) in a programming field; it is only necessary for an advanced language programmer to perform advanced language programming, without knowing details of the compiler; the compiler converts the program written in advanced language into a binary executable program (assembly language) that computer hardware may understand and execute; and the compiler will take into account a constraint condition of the binary executable program (assembly language) during the conversion process.

Figure 2:
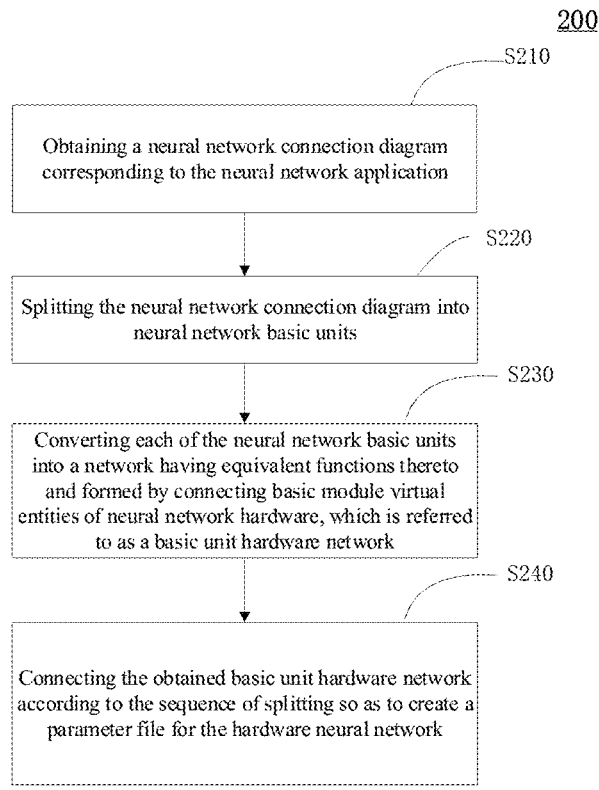
FIG. 2 shows a general flow chart of a hardware neural network conversion method 200 executed by a compiling layer 1200 according to an embodiment of the present disclosure.

FIG. 2 shows a general flow chart of a hardware neural network conversion method 200 executed by a compiling layer 1200 according to an embodiment of the present disclosure; and in the hardware neural network conversion method 200, a neural network application is converted into a hardware neural network fulfilling a hardware constraint condition.

The hardware neural network conversion method 200 comprises a neural network connection diagram obtaining step S210, a neural network connection diagram splitting step S220, a neural network basic unit conversion step S230, and a basic unit hardware network connection step S240.

In step S210, the neural network connection diagram obtaining step is executed, to obtain a neural network connection diagram corresponding to the neural network application, wherein, the neural network connection diagram is a directed diagram, each node in the diagram represents a layer of neurons, and each edge represents an inter-layer connection relationship.

Most multi-layer perceptrons or simple convolutional neural networks are represented in the form of the diagram, which is usually of a simple chain structure; and a complex neural network may be a diagram of an arbitrary form.

Usually, a neural network connection diagram is obtained by parsing from a neural network model file. However, not only a neural network connection diagram may be read and parsed from the model file, but also, for example, a neural network connection diagram may be constructed by some neural network software simulators at runtime just by a few lines of code.

Figure 3:
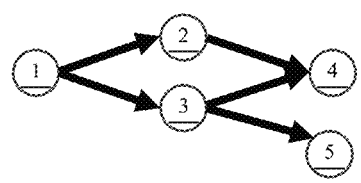
FIG. 3 shows an example of a neural network connection diagram, in which each of nodes 1, 2, 3, 4 and 5 represents a layer of neurons.

FIG. 3 shows an example of a neural network connection diagram, in which each of nodes 1, 2, 3, 4 and 5 represent a layer of neurons.

A specific example of the hardware neural network conversion method with the compiling layer 1200 will be given later with the neural network connection diagram shown in FIG. 3 as an example. With respect to the constraint of the hardware basic module involved in the example, exemplary configuration is as follows: the hardware basic module is capable of processing a weighting operation of a 16×16 matrix, each basic module only has 32 registers having a 8-bit width, 16×16=256 parameters of the matrix only record an index value, and input and output data has a 6-bit width; then operation of a ReLU activation function is performed to generate an output; and the hardware only supports 1-to-1 communication, that is, with respect to 16 outputs of the hardware basic module, each output may only be sent to one input of one other arbitrary module.

In the example, details of respective nodes and edges of the neural network connection diagram 300 shown in FIG. 3 are as follows:

Wherein, node 1 is an image with a size of 6×6, a total of 36 neurons.

Edge 1-2 is a convolution operation, with a total of 8 convolution kernels, each convolution kernel having a size of 3×3, so node 2 has 8×6×6, a total of 288 neurons, with ReLU as the activation function.

Edge 1-3 is maxpooling, with a pooling range of 2×2, so node 3 has 3×3, a total of 9 neurons.

Edge 3-5 is a full connection, and node 5 has 5 neurons, with ReLU as the activation function.

Node 4 has 32 neurons, and edge 2-4 and edge 3-4 are both full connections, with Sigmoid as the activation function.

Here the neural network connection diagram provides the neural network application a universal description, and is convenient to be split into a plurality of neural network basic units.

In step S220, the neural network connection diagram splitting step is performed, to split the neural network connection diagram into neural network basic units, wherein, each neural network basic unit has only ingress nodes and egress nodes without any intermediate layer node, the ingress nodes are in full connection with the egress nodes, all fan-outs of each neuron in the ingress node are within the basic unit, and all fan-ins of each neuron in the egress node are within the basic unit.

Figure 4:
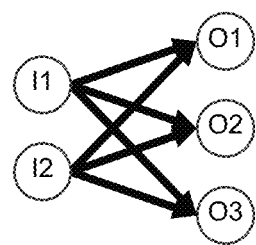
FIG. 4 shows an exemplary schematic diagram of a neural network basic unit 400.

FIG. 4 shows an exemplary schematic diagram of a neural network basic unit 400.

The neural network basic unit 400 includes two ingress nodes I1 and I2, three egress nodes O1, O2 and O3, and each node here represents a layer of neurons in the original neural network application. It may be seen that, the basic unit 400 does not include any intermediate layer node, and the ingress nodes are in full connection with the egress nodes, that is, the ingress node I1 is connected with each of the egress nodes O1, O2 and O3, and the ingress node I2 is also connected with each of the egress nodes O1, O2 and O3.

The neural network connection diagram splitting algorithm mainly includes two steps:

(1) Grouping all the nodes in the connection diagram according to their forward vertex sets, wherein, vertices of a same group have a same forward vertex set;

(2) If backward vertices of a vertex are distributed in a plurality of groups, adding a plurality of replicated vertices, wherein, each replicated vertex is connected with one of the groups.

At this time, each group and its common forward vertex set constitute a neural network basic unit, and all the replicated vertices and their source nodes also constitute a neural network basic unit. At this time, the entire neural network connection diagram is decomposed into a plurality of neural network basic units.

Figure 5:
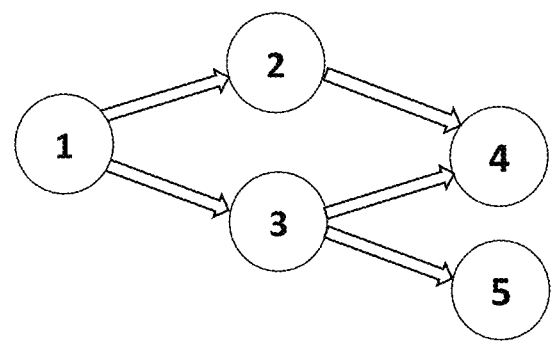
FIG. 5(a) to FIG. 5(c) show process schematic diagrams of splitting the neural network connection diagram into a plurality of neural network basic units.
Figure 5:
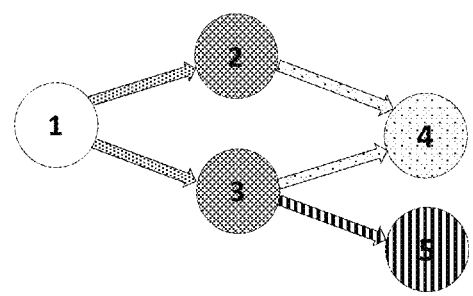
Figure 5:
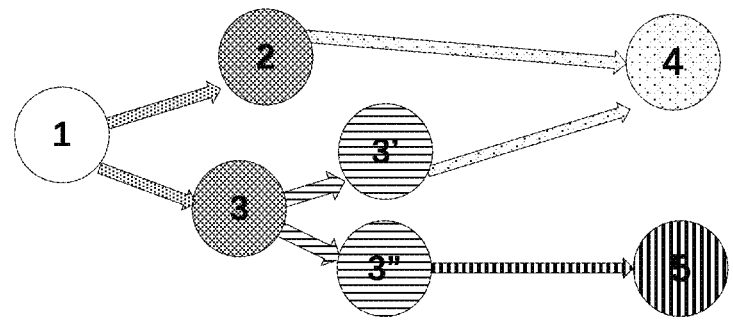

Hereinafter, an example of the process of splitting a neural network connection diagram into a plurality of neural network basic units will be described in conjunction with FIG. 5(a) to FIG. 5(c), with the neural network connection diagram shown in FIG. 3 as an example.

FIG. 5(a) is the neural network connection diagram shown in FIG. 3.

Firstly, grouping is performed according to a precursor vertex set: a precursor of node 2 is node 1, and a precursor of node 3 is node 1, so node and node 3 are drawn into one group, which is denoted as group 23; precursors of node 4 are 2 and 3, a precursor of node 5 is 3, so node 4 is separately 1 group, which is denoted as group 4; and node 5 is also separately 1 group, which is denoted as group 5. FIG. 5(b) shows grouping of the nodes with filling lines of the respective nodes.

At this time, backward nodes of node in FIG. 5(b) include group 4 and group 5, so two nodes 3' and 3" are added, whose sizes are exactly the same as that of node 3; connections of node 3 with the two vertices are just connections between corresponding neurons with weight 1, node is completely replicated; node is connected with node 4, and node 3" is connected with node 5, in a mode the same as a mode of connections of the original node 3 with node 4 and node 5. At this time, node 3 and the two replicated nodes also constitute a basic unit, which is denoted as group 33.

At this time, the network is split into 4 basic units; FIG. 5(c) shows the 4 basic units with edges of 4 different filling lines; specifically, nodes (1, 2, 3) constitute a basic unit, nodes (3, 3''', 3) constitute a basic unit, nodes (2, 3', 4) constitute a basic unit, and nodes (3", 5) constitute a basic unit.

Return to FIG. 2, after the neural network connection diagram splitting step S220 is completed, the process proceeds to step S230.

In step S230, the neural network basic unit conversion step is performed, to convert each of the neural network basic units so as to form a network having equivalent functions thereto and formed by connecting basic module virtual entities of neural network hardware, which is referred to as a basic unit hardware network, wherein, one neural network basic unit corresponds to one or more basic module virtual entities of the neural network hardware, and each basic module virtual entity of the neural network hardware fulfills a connectivity constraint condition of a neural network hardware basic module, and is capable of being directly mapped to the neural network hardware basic module.

In one example, the neural network basic unit conversion step includes: reconstructing a network topology for each neural network basic unit; and determining a weight parameter for the reconstructed network topology.

As described above, a hardware processing core on a neural network hardware chip is usually simplified, whose capability is usually weaker than a neural network application of a same size. The above-described reconstructing a network topology is intended to change the topology and enhance a hardware network capability; and the determining a weight parameter is intended to perform fine adjustment on the weight to approximate to an output of the original neural network application.

Figure 6:
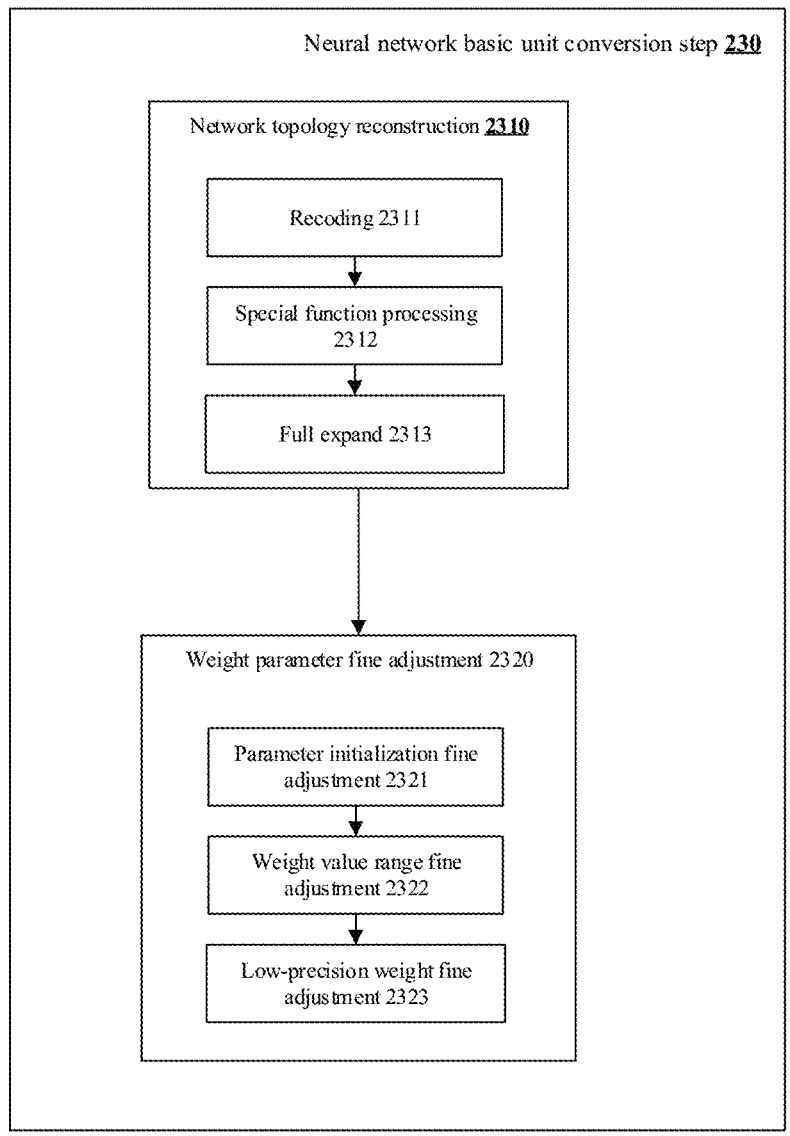
FIG. 6 shows a schematic diagram of a network topology reconstruction operation and a weight parameter fine adjustment operation in neural network basic unit conversion.

Subsequently, the network topology reconstruction operation and the weight parameter fine adjustment operation in basic unit conversion will be described in detail with reference to FIG. 6.

It should be noted that, the conversion of step S230 is respectively performed with respect to respective neural network basic units.

In a preferred example, the respective neural network basic units are converted one by one in the topological order of the neural network connection diagram. This is based on considerations below: computation performed by the neural network basic unit is relatively simple, so fine adjustment may have rapid convergence, but there is still a small amount of error. If the error accumulates layer by layer, the error of the entire neural network will eventually become very large. Therefore, the respective neural network basic units do not undergo the above-described conversion algorithm in parallel and independently of one another, but the respective neural network basic units are converted one by one in the topological order. The training data sources required for retraining during the conversion process are as follows:

(1) Input data: since the training is performed in the topological order, when a certain neural network basic unit is being converted, all neural network basic units prior to the current neural network basic unit should be converted already; then, the input data used for training the current neural network basic unit is an output generated by a training sample of the original network that has undergone computation of these previous converted neural network basic units, whereby the conversion error of the previous neural network basic units may be substituted into fine adjustment of this layer in an attempt to eliminate;

(2) Output data: the output data is still an output value of a corresponding neuron of the original network under a corresponding sample.

With a chain-like neural network connection diagram as an example, output values of all samples in the respective layers in the original neural network are $\{Y_1, Y_2, \ldots, Y_N\}$; with $Y_1$ and $Y_2$ as input data and output data, a first neural network basic unit $f_1(Y)$ is trained, so that an error of its output value $Y_2'=f_1(Y_1)$ from is as small as possible; next, with $Y_2'$ and $Y_3$ as input data and output data, a second neural network basic unit $f_2(Y)$ is trained, so that an error of its output value $Y_3'=f_2(Y_2')$ from $Y_3$ is as small as possible; and the neural network basic units undergo conversion and fine adjustment one by one, until the last layer.

In this way, the error may be avoided from being accumulated layer by layer, so that the error of the finally obtained neural network from the original network is as small as possible.

In a case where the neural network connection diagram is a directed acyclic diagram, the respective neural network basic units may be converted one by one directly in the topological order of the neural network connection diagram;

In a case where the neural network connection diagram is a cyclic directed diagram, for example, with respect to the RNN, firstly, a cycle of the cyclic directed diagram is broken, so that the neural network connection diagram becomes a directed acyclic diagram, and then the respective neural network basic units are converted one by one in the topological order of the directed acyclic diagram.

In the topological order, the converted respective neural network basic units are trained, wherein, training data sources required for retraining are that: training input data is an output generated by a training sample having undergone a topological order-preceded basic unit hardware network, and training output label is an output generated by the training sample in a corresponding layer of the original neural network application.

Having undergone the above-described conversion operation for each neural network basic unit, each neural network basic unit is converted into a basic unit hardware network, which not only determines connections between respective basic module virtual entities in the basic unit hardware network, but also determines configuration of a weight parameter, and the like.

For example, it is illustrated still with the foregoing example, with respect to the respective groups (the neural network basic units) shown in FIG. 5(c), in the topological order, group 23 is firstly converted, then group 33, and finally group 4 and group 5.

After the neural network basic unit conversion step S230 is completed, the process proceeds to step S240.

In step S240, the basic unit hardware network connection step is performed, to connect the obtained basic unit hardware networks according to the sequence of splitting so as to create a parameter file for the hardware neural network.

After all the neural network basic units are converted, the respective converted basic units are reconnected according to the sequence of splitting; since each basic unit is converted into a small network composed of a bunch of virtual cores, what is obtained after reconnection is a hardware neural network composed of the virtual cores. Here, the virtual core is the basic module virtual entity as described above.

Then, according to a physical network topology characteristic of the hardware, a corresponding mapping algorithm is used for mapping the virtual cores onto physical networks, to implement efficient communication.

In addition, if the processing core of the target hardware supports time division multiplexing, characteristics of communication and weight multiplexing may be comprehensively considered, and virtual cores with a same weight value or virtual cores connected closely are mapped onto a same physical core.

As described above, the existing technical route is, without exception, to directly adapt the neural network application to the chip: either directly adapt the chip to the freedom degree of the application, which brings a performance bottleneck; or expose the chip constraint to the application, which constrains capabilities of the application. In contrast, in the hardware neural network conversion method according to the embodiment of the present disclosure, the addition of an intermediate layer between the neural network application and the neural network chip resolves the issue of adaptation between the neural network application and the neural network application chip by means equivalent to a compiling technology in the traditional computer system, and in the meantime, decouples applications from chip development.

In addition, in the hardware neural network conversion method according to the embodiment of the present disclosure, with respect to an arbitrary complex neural network and arbitrary hardware fulfilling hardware abstraction, there is provided a universal process, which may convert the complex neural network into a specific network fulfilling the hardware constraint condition, and having substantially equivalent functions to the original network. The core of the process is to decompose the complex network; since an operation executed by each basic unit is relatively simple, the conversion process may be more securely converged than direct conversion of the entire network, with a faster convergence speed.

Moreover, in the hardware neural network conversion method according to the embodiment of the present disclosure, the nodes in the neural network connection diagram are grouped, and the neural network is split into a plurality of basic units, so that all ingress edges or egress edges of an arbitrary node within the basic unit are all within the basic unit, and thus, after the issue of connectivity is resolved within the basic unit, the converted basic units are reconnected, and the obtained network can still fulfill the connectivity requirement.

In addition, in one example as described above, modules are converted one by one in the topological order, and the previously generated error is introduced into subsequent fine adjustment, so that the error introduced by conversion of the respective basic modules will not be accumulated layer by layer.

In addition, in one example, in a case where the neural network application has a convolution layer, before the neural network connection diagram splitting step S220, network compression may be performed on the convolution layer of the neural network application, which is also referred to herein as hardware independent optimization, because optimization is independent of the neural network hardware chip.

Hardware independent optimization may reduce a size of the neural network and compress the neural network. Various related technologies may be used here, for example, the prior art, a determinantal point process (DPP)-based technology for extracting neuron diversity to perform network compression; however, the prior art is only applicable to a simple full connection network, and may not be directly applied to a common convolutional neural network.

Firstly, an overview of DPP is provided.

DPP is a technology for obtaining a diversity subset; it is assumed that there is a set L consisting of N elements, with a total of $2^N$ subsets. There is an N×N matrix K If there is a probability $(A) \propto |K_A|$ for sampling a subset $A \subseteq L$ from the N elements, where $K_A$ represents a submatrix of K which is spanned by rows and columns corresponding to elements in set A, and $|K_A|$ represents a determinant of $K_A$, then the process is referred to as DPP. If a matrix element $K_{ij}$ represents similarity between an ith element and a jth element, then the lower the similarity of the elements in the subset, the higher the probability to obtain the subset sampled by using DPP, so a subset with the highest probability is the highest diversity subset.

According to one embodiment of the present disclosure, the prior art DPP is extended to a more practical convolutional neural network through ingenious design.

Specifically, in the convolutional neural network, each layer has a plurality of feature maps, and information carried by these feature maps is usually redundant. Similarity between outputs generated by the feature maps on all samples is taken as a matrix element of K, a highest diversity subset is obtained by using the DPP, the subset is reserved, other feature map nodes are discarded, a vector corresponding to the discarded feature map is projected into a linear space spanned by the reserved feature map, a ratio of a projection length of the discarded feature map to its original vector length is taken as a weighting coefficient, and a connection weight between the discarded feature map and a next layer of neurons is accumulated in a weighted manner onto a connection weight between the reserved feature map and the next layer of neurons.

The method of hardware independent optimization for each layer of neurons is illustrated still with the foregoing connection diagram shown in FIG. 3 as an example.

As described above, FIG. 3 mainly includes three types of connections: convolution, full connection and maxpooling, wherein, maxpooling is a parameter-free layer that does not require optimization, while the other two types of layer may both have their sizes compressed by using DPP-based diversity detection.

For example, the operation represented by edge 1-2 is a convolution operation, node 2 includes 8 feature maps, similarity between vectors $Y_i$ composed of outputs generated by a training sample of the network on the 8 feature maps is derived to construct an 8×8 matrix, and a DPP method is used for sampling a highest diversity subset, which is assumed to include 6 feature maps, which are set to respectively have output vectors $Y_1, \ldots, Y_6$, then remaining $Y_7$ is projected within a linear space spanned by $Y_1, \ldots, Y_6$, with projection values $\alpha_1, \ldots, \alpha_6$ respectively on $Y_1, \ldots, Y_6$, then the original 8×6×6 neurons are in full connection with 32 neurons at edge 2-4, and a connection weight between 6×6 neurons corresponding to $Y_7$ and 32 neurons is multiplied by $\alpha_i$ and accumulated onto a connection weight between 6×6 neurons corresponding to and 32 neurons. Similarly, unselected $Y_8$ is processed, and at this time, a size of node 2 becomes 6×6×6, a total of 216 neurons.

Nodes 4 and 5 are output nodes, which are unable to be compressed, and node 3 is a node obtained by maxpooling, which is unable to be compressed. Thus, node 2 is changed to have a size of 6×6×6 through hardware independent optimization.

By using the network compression algorithm for the convolutional neural network according to the embodiment of the present disclosure, through extension of the prior art solution, the highest diversity feature map subset in each layer of the convolutional neural network is selected by using the method of DPP for extracting the diversity subset, and the remaining feature map node is discarded, so as to effectively reduce the number of feature maps in each layer of the convolutional neural network, trim the size of the network, and reduce overhead of hardware resources; moreover, influence on network precision is lowered in a mode of projection and fine adjustment. Through this method, redundancy in the network may be effectively removed, and occupation of hardware resources is reduced.

Hereinafter, a specific implementation example of neural network basic unit conversion will be described in detail in conjunction with FIG. 6 to FIG. 9.

As described above, neural network basic unit conversion 230 may include a network topology reconstruction operation 2310 and weight parameter fine adjustment 2320, wherein, the network topology reconstruction operation 2310 may include recoding 2311, special function processing 2312 and fully expansion 2313; and the weight parameter fine adjustment 2320 may include parameter initialization fine adjustment 2321, weight value range fine adjustment 2322 and low-precision weight fine adjustment 2323. The network topology reconstruction operation 2310 is intended to enhance a hardware network capability, and the weight parameter fine adjustment 2320 is intended to approximate to the original neural network application output.

Hereinafter, respective specific operations are described in detail.

1. Recoding 2311 is Performed on Inter-Layer Data with an Autoencoder.

Since precision of data transmitted during neural network hardware communication is usually very low, if data of the original network is directly rounded off, it is likely to lose information. Therefore, the data transmitted between neural network layers is recoded with low precision, so that main information is not lost even at low precision.

The autoencoder, as an information encoding technology with the neural network, consists of three layers of neurons, including an input layer, a hidden layer and an output layer, wherein, the number of nodes of the output layer is equal to the number of nodes of the input layer. The network is trained, so that a value of the output layer is as approximate to a value of the input layer as possible. A value of the hidden layer is another type of code of the input data; computation from the input layer to the hidden layer is an encoding process, corresponding to an encoder, while computation from the hidden layer to the output layer is a decoding process, corresponding to a decoder (with reference to FIG. 7). Since data obtained by hidden layer decoding is close to the input layer, the main information is not lost through hidden layer encoding.

Figure 7:
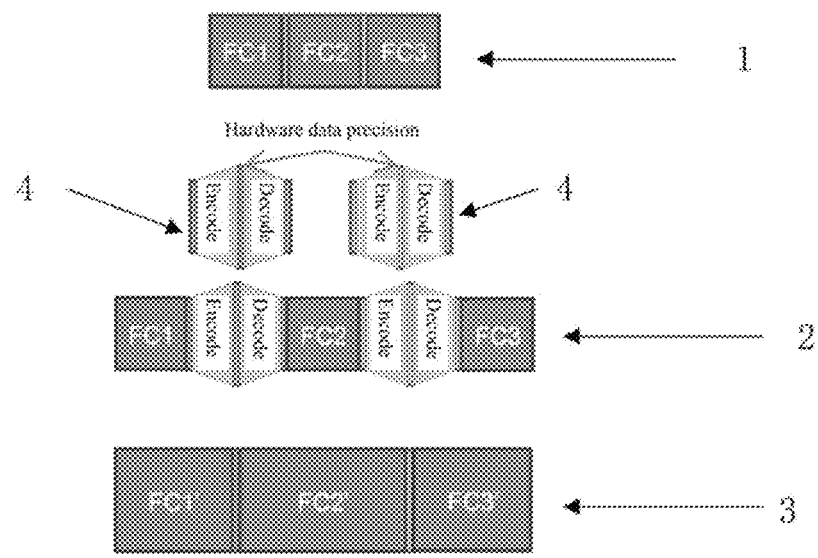
FIG. 7 shows a process schematic diagram of recoding a three-layer neural network with an autoencoder to obtain an expanded three-layer neural network.

FIG. 7 shows an expanded three-layer neural network obtained after recoding a three-layer neural network with an autoencoder. As shown in FIG. 7, 1) a vector (an output vector between layers FC1 and FC2, and an output vector between FC2 and FC3 shown in FIG. 7) is output into each inter-layer connection (between layers FC1, FC2 and FC3, as denoted by reference sign 1); 2) an autoencoder with a hidden layer having hardware data precision applied thereto (a group of encoding and decoding shown in FIG. 7, as denoted by reference sign 4) is constructed, and the number of nodes of the hidden layer is greater than dimensionality of inter-layer vector data; through training the autoencoder, codes of the inter-layer vector under hardware data precision is obtained; and it should be noted that an input and an output of the autoencoder are still of the original precision, for example, floating point precision, but only the intermediate hidden layer is of hardware precision; 3) the autoencoder is inserted between layers of the neural network, to replace the original inter-layer vector, as denoted by reference sign 2; and 4) with respect to each connection, a decoder of an input node, a weight matrix of the connection, and an encoder of an output node thereof will be combined into a larger-size connection matrix, as denoted by reference sign 3; and as compared with sizes of the old layers FC1, FC2 and FC3, sizes of new layers FC1', FC2' and FC3' are expanded.

In the above way, the inter-layer vector of the neural network is replaced with a vector encoded in hardware precision, which ensures that information is not lost due to precision applied to the inter-layer vector, and in the meantime, expands the size of the connection matrix, and enhances an approximation capability of the hardware network.

Hereinafter, a processing example of the autoencoder of the convolution layer will be described. For example, a layer of c×w×h (c channels, w wide, h high) undergoes a k×k convolution kernel, to obtain a hidden layer of c'×w×h, which, after undergoing an activation function and then the k×k convolution kernel as well as the activation function, is decoded back to c×w×h. At this time, both the encoder and the decoder are convolution operations.

If what is connected next is still a convolution layer, then it is equivalent to performing 3 consecutive convolution operations from the hidden layer of the current layer to a hidden layer of the next layer: firstly the decoder, then the convolution layer, and finally the encoder; the 3 consecutive convolution operations may be combined into one convolution operation, for example, 3 consecutive 3×3 convolution operations may be combined into one 7×7 convolution operation; because each pixel is connected with a pixel within a previous 3×3 field, the pixel within the 3×3 field is connected with a pixel within a 5×5 field in a layer prior to the previous layer, and a further previous one is a 7×7 field, the 7×7 convolution kernel may be initialized through the 3 3×3 convolution kernels.

If what is connected next is a full connection layer, the convolution operation of the decoder is directly expanded into a matrix, which is then multiplied by the next full connection matrix and the encoder matrix of the next layer, to obtain a result, which is used for initializing a large matrix between hidden layers.

The recoding process is illustrated still with the foregoing neural network application as an example. With respect to respective groups shown in FIG. 5(c), with group 23 as an example, an input image has a size of 6×6; since important information in the image may be lost if directly rounded to 6 bits, the input image may be recoded; an autoencoder having a hidden layer of 2×6×6 is set, the hidden layer having output precision of 6 bits, an encoder and a decoder are obtained, the network input image is firstly processed by the encoder and then input into the network, and node 1 is changed to have a size of 2×6×6; it may be seen that the size after recoding is expanded as compared with the size of 6×6 of the original node 1.

Similarly, node 2 is processed, it is assumed that node 2 is changed to have a size of 9×6×6 in the above-described mode, and it may be seen that the size after recoding is expanded as compared with the size of 8×6×6 of the original node 2.

Node 3 is a result obtained by maxpooling, so it is not necessary to recode; however, since the input layer is recoded to 2×6×6, node 3 is also correspondingly changed to have a size of 2×3×3, a total of 18 neurons.

In another example, the autoencoder is configured as follows: the autoencoder has an input which is before an inter-layer output undergoes an activation function, and an output which is after the inter-layer output undergoes an activation function. For example, the autoencoder has an input which is an output result before FC1 undergoes an FC1 activation function, and an output which is an output result after FC1 undergoes an activation function. It is equivalent to that the autoencoder is made to learn the activation function of FC1 (the standard autoencoder directly has the input the same as the output). An output of FC2 is processed in a same manner. In other words, the original network has a form below: FC1 matrix vector multiplication output→FC1 activation function→FC2 matrix vector multiplication output→FC2 activation function→ . . . . . Now the respective activation functions are replaced with the corresponding autoencoders, it is as follows: FC1 matrix vector multiplication output→FC1 encoder→FC1 decoder→FC2 matrix vector multiplication output→FC2 encoder→FC2 decoder→ . . . , wherein, FC1 decoder→FC2 matrix vector multiplication output→FC2 encoder are combined into a large matrix. This also achieves an effect below: the inter-layer vector of the neural network is replaced with the vector encoded in hardware precision, which ensures that information is not lost due to precision applied to the inter-layer vector, and in the meantime, expands the size of the connection matrix, and enhances an approximation capability of the hardware network.

2. Special Function Processing 2312

Since in the neural network, there are usually not only operations such as matrix multiplications and convolutions, but also some special operations, for example, the maxpooling operation which is very commonly used in the convolutional neural network. Its core is a max function, which is usually parameter-free fixed computation, so a special neural network may be constructed for such a function to implement its function.

For example, the max function may be implemented with a plurality of ReLU activation functions (ReLU(x)=max(x, 0)):

$$\max(a,b)=0.5\text{ReLU}(a+b)+0.5\text{ReLU}(a-b)+0.5\text{ReLU}(b-a)+0.5\text{ReLU}(-b-a)$$

Figure 8:
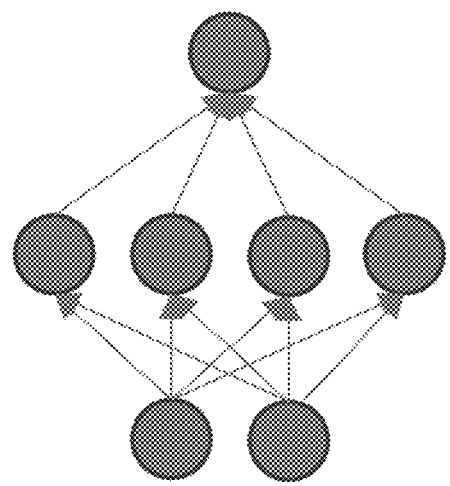
FIG. 8 shows neural network replacement of a max operation.

Therefore, the max operation may be replaced with a neural network shown in FIG. 8.

It is necessary to process node 3 in the foregoing example with a special function. Edge 1-3 is a maximizing operation performed on outputs of every 4 neurons in node 1 to obtain one output in node 3, and there are a total of 18 such operations.

Two input values may be maximized with the neural network shown in FIG. 8; with 3 such network combinations, 4 input values may be maximized, that is, maximized in a pairwise manner; and the two maximal values may be further maximized. Then maxpooling of edge 1-3 is replaced with 18 networks for maximizing 4 inputs.

Of course, if there is a computing resource of the special function in the hardware resource, the corresponding special function processing may also be omitted, to directly use the computing resource provided by the hardware.

3. Fully Expansion 2313

Since the target hardware only supports a fixed-size matrix vector multiplication operation and has a constraint on connectivity, in a case where a size of the neural network basic unit exceeds the hardware constraint, it is necessary to decompose and combine a large-size matrix multiplication (optionally, together with a convolution operation) in the neural network basic unit, which is referred to herein as a fully expanded operation; and after fully expansion, the neural network basic unit is decomposed into interconnections between basic module virtual entities (or referred to as virtual cores).

Figure 9:
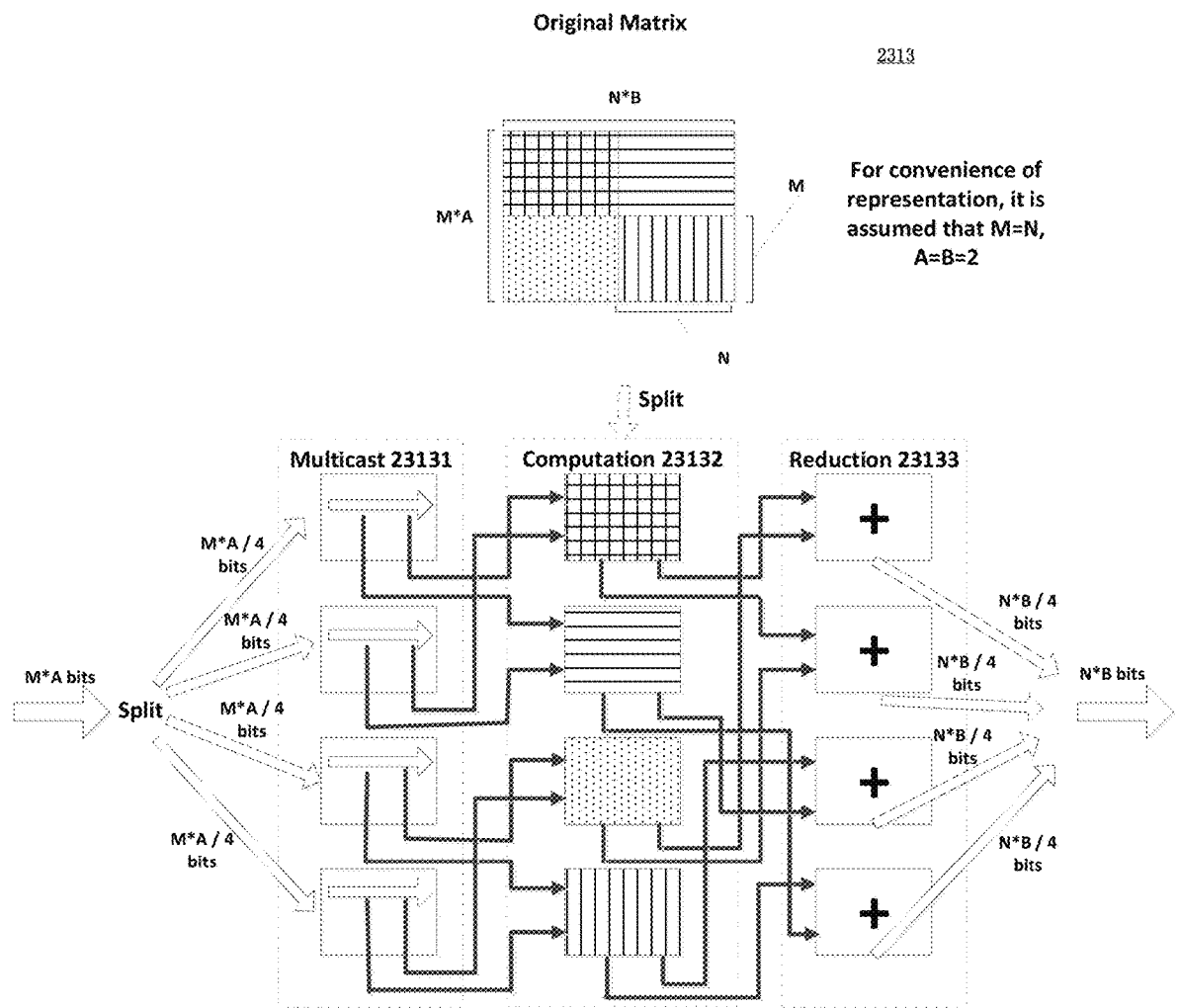
FIG. 9 shows an exemplary schematic diagram of fully expansion 2313 for a large-size matrix multiplication operation, according to the embodiment of the present disclosure.
Figure 10:
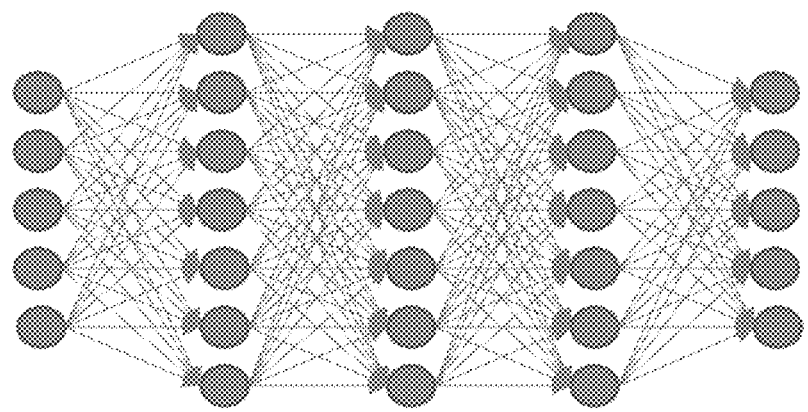
FIG. 10 shows a schematic diagram of a chain-like neural network.
Figure 11:
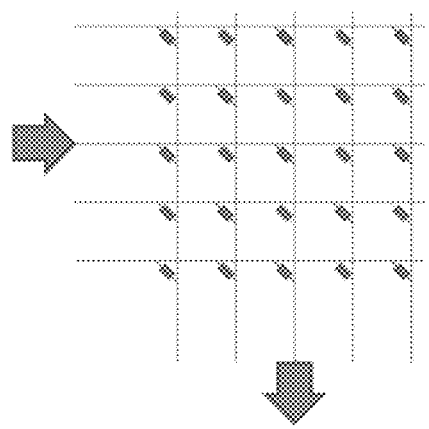
FIG. 11 shows a structural schematic diagram of a crossbar based on a memristor.

FIG. 9 shows an exemplary schematic diagram of fully expansion 2313 for a large-size matrix multiplication operation, according to the embodiment of the present disclosure.

In FIG. 9, M and N define a matrix size that the virtual core is capable of processing, and A and B define a size of an actual large-size matrix relative to the matrix size of the virtual core; and for convenience of representation in the diagram, it is assumed that M=N, A=B=2.

As shown in FIG. 9, with respect to the large-size matrix multiplication and the convolution operation, in this embodiment, 3 groups of virtual cores are used for relative computation: wherein, (1) a computation group 23132 is responsible for a real operation, which splits the large-size matrix multiplication (a connection matrix in FIG. 9 is M*A) into a plurality of small matrices (there are 4 M*N matrices in FIG. 9), which are distributed in the group of virtual cores for real computation; each virtual core is responsible for a small matrix operation; and with respect to a large-size convolution, the convolution is stripped, and also decomposed into a plurality of small matrices for processing; (2) two other groups of virtual cores, a multicast group 23131 and a reduction group 23133, are respectively used for multicast and reduction; each of virtual cores used for multicast replicates each input data into a plurality of copies (two copies are shown in FIG. 9), and distributes to small matrices that require the data; an output of the virtual core is an N-dimensional vector, and the multicast operation is a bisection operation, so an input of the virtual core for the multicast operation is N/2, that is, M*A/4; each virtual core in the computation group 23132 receives outputs from two virtual cores that execute the multicast operation, that is, an M-dimensional (which, in this case, is also an N-dimensional) input is formed; then each virtual core in the computation group 23132 executes a matrix vector multiplication operation of the M-dimensional vector and the M*N-dimensional matrix, to obtain a result which is an N-dimensional vector, and divides the N-dimensional vector into two halves which are respectively output to two virtual cores that execute reduction; and the virtual core used for reduction accumulates output data of respective small matrices with respect to a same neuron, to obtain a final output, which is an output of N*B bits as shown in FIG. 9.

In the example shown in FIG. 9, the fully expanded operation performed on the neural network basic unit is illustrated with the virtual core where M=N and the actual neural network basic unit where A=B=2; it should be noted that this is only exemplary, but should not be construed as limitative to the present disclosure; if M is not equal to N, the number of cores of the multicast layer and the reduction layer may be assigned according to actual sizes of M and N.

After fully expansion, the neural network basic unit is decomposed into a series of interconnections between virtual cores, and each virtual core fulfills a connectivity constraint condition of the hardware processing core.

The fully expanded operation of the basic unit is illustrated still with the foregoing example as an example, at this time, edge 2-3 has an input of 2×6×6 and an output of 9×6×6; through 3×3 convolution, 9 points corresponding to arbitrary coordinates x, y in 9 output feature maps have their inputs originated from a total of 18 points, which are within a 3×3 range around corresponding positions in 2 input feature maps, so there are 18×9 such full connection structures; and the convolution operation may be converted into 6×5, a total of 36 full connection operations whose sizes do not exceed 18×9 (an edge of the image may have less than 18 input nodes, so "sizes do not exceed" is expressed here). However, the size of 18×9 still exceeds a hardware constraint condition of 16×16, so it is split into 2 small matrix multiplication operations of 9×9, and with respect to each output in node 1, it is necessary to provide data for 3×3=9 matrices whose sizes are 18×9; while since each one is further split into 2 small matrices whose sizes are 9×9, it is necessary to provide input data for 18 small matrices whose sizes are 9×9; meanwhile, with respect to each output in node 1, it is also necessary to provide 1 piece of data in edge 1-3, so with respect to each output in node 1, it is necessary to send data to 19 hardware basic modules; while the hardware has a size of 16×16, and in the process of fully expansion, each output in node 1 is firstly sent to 1 hardware basic module, to obtain 16 copies of outputs, wherein, 15 are directly connected with 15 hardware basic modules that require the data, and a last one is connected with one hardware module to further replicate 4 outputs, which are connected with remaining 4 hardware basic modules that require the data. Thus, the neural network basic unit is decomposed into a series of interconnections between virtual cores, with each virtual core fulfilling the connectivity constraint condition of the hardware processing core.

4. Weight Parameter Fine Adjustment 2320

Next, the weight parameter of the basic unit hardware network is obtained after the final step of network topology reconstruction 2310. With respect to the weight parameter of the basic unit hardware network, firstly, the weight parameter may be initialized according to the original network weight parameter, then a weight constraint is introduced in a stepwise manner, and each time the network parameter is subjected to fine adjustment, so that the error of the hardware network from the original network is as small as possible.

For ease of understanding, before how to perform weight parameter fine adjustment is described in detail, an abstract operation for selecting a value for a hardware weight according to the embodiment of the present disclosure is introduced firstly. A lot of hardware usually greatly simplifies the weight, for example, some hardware stores weights with an 8-bit integer, some hardware stores weights with a dynamic fixed-point number (that is, a fixed-point number whose decimal point position is configurable); and IBM's TrueNorth assigns registers of three 8-bit integers to each neuron, and all weights thereof are selected from the 3 integers and 0. With respect to various hardware designs, a hardware weight value selection constraint may be abstracted as follows.

A value range of a weight matrix W may be considered as a set $S^P$, and each element in the set is a function of parameter P, where P is a hardware configurable parameter. For example:

With respect to the hardware that uses an 8-bit integer, there is no parameter, and the set S={−128, 127, . . . , −1, 0, 1 . . . , , 127};

With respect to a dynamic fixed-point number, a decimal point position is taken as a parameter P, and the set $$S^P = \left\{ -\frac{2^N}{2^P}, -\frac{2^N-1}{2^P}, \ldots, -\frac{1}{2^P}, 0, \frac{1}{2^P}, \ldots, \frac{2^N-1}{2^P} \right\};$$

With respect to IBM TrueNorth, a value of the register is taken as parameter P, and the set $S^{P_1,P_2,P_3}=\{0, P_1, P_2, P_3\}$;

Each element $W_{ij}$ in the weight matrix may be independently selected from $S^P$, that is, index $k_{ij}$ may be independently configured such that $W_{ij}=S_{k_{ij}}^P$, so what the weight matrix W is capable of configuring is a set parameter P and an index $k_{ij}$ of values of respective weights in the set.

After abstraction of the hardware weight value selection constraint is given, an example of a weight parameter determination method according to the embodiment of the present disclosure is described below.

Firstly, initialization is performed according to a weight of the original neural network to construct a weight of the basic unit hardware network. Then fine adjustment is performed on the weight parameter so that the weight fulfills the hardware weight constraint.

This is mainly divided into three steps.

(1) Firstly, expressing the weight with floating point precision, and retraining the constructed network, so that the error from the original network is as small as possible, in order to compensate for a difference between the hardware activation function or the hardware neuron model and the original neural network. This step corresponds to the operation of parameter initialization fine adjustment 2321 in FIG. 6.

(2) Determining a best (where is the configurable parameter as mentioned in the above-described hardware weight constraint abstraction) and k (that is, the index of values of the above-described respective matrix elements in a set $S^P$) by using an expectation maximization (EM) algorithm, according to the parameter obtained by training in step (1), at which time all weight parameters may be expressed as a function of P, and retraining to adjust P. This step corresponds to the operation of weight value range fine adjustment 2322 in FIG. 6.

The EM algorithm is intended to select an appropriate F, so that after the weight parameter of floating point precision is rounded to a set $S^P$, the introduced error is as small as possible, that is, the objective function $J(k,P)=\Sigma(W_{ij}-S_{k_{ij}}^{P})^2$ is minimized.

According to the standard EM algorithm:
E-step: given that $P=P^{(t)}$, let $k_{ij}^{(t)}=\arg\min J(k|P^{(t)})$
M-step: given that $k_{ij}=k_{ij}^{(t)}$, let $P^{(t+1)}=\arg\min J(P|P^{(t)})$ The algorithm automatically degenerates into a k-means algorithm in a case of shared weights in IBM TrueNorth. The k centroids to which the weights are distributed are computed, so as to set values of the registers to the values of these centroids, and set an index of all the weight values to the closest centroid.

(3) In a case that P obtained by training in step (2) is fixed, initializing all the weights to corresponding $S_{k_{ij}}^{P}$, retraining to adjust $k_{ij}$, storing all the weights with floating point precision, but rounding all the weight parameters to the most approximate value in S in a feedforward process of training, and then bringing into feedforward computation, while feeding back and updating the weights still with floating point precision, and updating the weight values of floating point precision. This step corresponds to the operation of low-precision weight fine adjustment 2323 in FIG. 6.

The weight fine adjustment process is illustrated still with the foregoing example as an example. With respect to group 23, firstly, fine adjustment is performed on the weight with floating point precision, to compensate for errors introduced by the autoencoder and other operations.

Then, according to the obtained parameter, 256 parameters within each hardware basic module are subjected to the k-means algorithm, and aggregated to 32 clusters; and each parameter is represented by a cluster centroid. Fine adjustment is performed for a second time, to adjust numerical values of 32 centroids of respective modules.

Finally, the centroid values obtained by the training is filled into 32 registers, for a third time of fine adjustment, at which time, all the weight parameters are represented by a floating point value; in the feedforward process, a centroid value most approximate to the floating point value is found, and brought into computation, a gradient obtained through feedback is used for updating the floating point value of the weight; after fine adjustment, an index value of the respective weight parameters is determined.

So far, group 23 is converted completely, the training data undergoes the converted group 2 to obtain output values of node 2 and node 3, and these output values are taken as training data used in a subsequent conversion process of group 33. Group 33, group 4 and group 5 are converted one by one.

The hardware neural network conversion method according to the embodiment of the present disclosure and specific implementation of the respective steps therein are described above in detail with reference to the accompanying drawings and in conjunction with the examples. It should be noted that the detailed examples in these processes are given, in order that those skilled in the art may understand thoroughly, and these detailed examples should not be construed as limitative to the present disclosure. Various changes may be made to specific implementation of the present disclosure according to needs.

For example, in the foregoing example, during abstraction of the target hardware, communication supported by the hardware requires that an output of each processing core may only have one target node, which, thus, constrains an fan-out of each neuron in the neural network. With respect to the constraint, in the neural network connection diagram splitting step shown in FIG. 2, the fan-out is increased by adding replicated nodes; and in the fully expanded operation in the neural network basic unit conversion step, a group of virtual cores is used for multicast. But obviously, if the hardware itself supports a one-to-many communication mode, these additional replicated nodes and processing cores for multicast may be all omitted, to reduce overhead of the hardware resource.

In addition, many foregoing steps are formulated with respect to a certain hardware constraint; if the target hardware does not have a corresponding constraint, a corresponding process may be omitted. For example, in step 2 of weight fine adjustment, a parameter P is determined through the EM algorithm and retraining, and the step may be omitted for hardware that uses fixed precision and has no parameter P. In step 3 of weight fine adjustment, which is mainly designed with respect to low weight precision, if the target hardware itself supports the weight of floating point precision, the corresponding step may also be omitted.

In addition, in the foregoing example, special function processing is performed, so that the hardware may successfully complete computation of the special function, even if it does not support special function processing; however, if there is a computing resource of the special function in the hardware resource, the corresponding processing may also be omitted, to directly use the computing resource provided by the hardware.

In addition, if the hardware provides an additional adder, which may accumulate different processing core outputs, the processing core used for reduction in the fully expansion strategy may also be omitted, to directly use the hardware-provided adder for completing the corresponding operation.

Further, it should be noted that, the hardware neural network conversion technology according to the embodiment of the present disclosure is universal, and is applicable to various neural networks, for example, artificial neural networks (ANN), spiking neuron networks (SNN), recurrent neural networks (RNN), and the like.

In the foregoing technical details, the neural network in the form of ANN is mainly discussed, and the technical solutions according to the embodiments of the present disclosure are equally applicable to the SNN and the RNN.

1. SNN Processing

If the original neural network application is the SNN: frequency coding is commonly used in the SNN, that is, data transmitted thereby is represented by a frequency at which a neuron discharges an electrical pulse, so an electrical pulse of a stable frequency is taken as an input with respect to the original neural network application; and electrical pulse discharge frequencies of respective neurons are recorded, which are taken as the training data used in the neural network basic unit conversion step S230.

If the model involved in the neural network hardware chip is the SNN: with respect to the neuron model of the SNN, the neuron usually generates an electrical pulse of a stable frequency with respect to a stable current input; and if an electrical pulse of a stable frequency is input into a synapse, the synapse also generates a stable current to input into the neuron. The two relations are usually continuous and derivable, so gradient computation may be applied, and training may be performed by using a back-propagation algorithm.

2. RNN Processing

The neural network connection diagram of the RNN is a cyclic diagram.

As described above, the respective neural network basic units are converted preferably in the topological order. Topological-order conversion requires that the neural network connection diagram may be topologically sorted, while only a directed acyclic diagram may be topologically sorted, so with respect to a neural network having a cycle, the existing cycle may be broken, to change the neural network connection diagram into a directed acyclic diagram, at which time the above-described conversion may be performed; after the conversion, the cycle is re-spliced, and overall fine adjustment is performed on the entire network, to make it approximate to the original network.

In another embodiment, the present disclosure is implemented as a hardware product, for example, compiler hardware, or other form of computing device, which not only receives a neural network application and/or a neural network connection diagram as an input, but also receives configuration (for example, a constraint, and the like) of a neural network hardware chip as an input, and then obtains a parameter file for a hardware neural network. Based on the parameter file, the neural network hardware chip is configured by using a certain mapping algorithm, so that the neural network hardware chip may implement the neural network application. The computing device according to the embodiment of the present disclosure is configured to convert the neural network application into the hardware neural network fulfilling a hardware constraint condition, comprising a memory and a processor, the memory having computer-executable instructions stored therein, and when executing the computer-executable instructions, the processor executing the foregoing hardware neural network conversion method, the method comprising: a neural network connection diagram obtaining step of obtaining a neural network connection diagram corresponding to the neural network application, wherein, the neural network connection diagram is a directed diagram, each node in the diagram represents a layer of neurons, and each edge represents an inter-layer connection relationship; a neural network connection diagram splitting step of splitting the neural network connection diagram into neural network basic units, wherein, each neural network basic unit has only ingress nodes and egress nodes without any intermediate layer node, the ingress nodes are in full connection with the egress nodes, all fan-outs of a neuron in the ingress node are within the basic unit, and all fan-ins of each neuron in the egress node are within the basic unit; a neural network basic unit conversion step of converting each of the neural network basic units so as to form a network having equivalent functions thereto and formed by connecting basic module virtual entities of neural network hardware, which is referred to as a basic unit hardware network, wherein, one neural network basic unit corresponds to one or more basic module virtual entities of the neural network hardware, and each basic module virtual entity of the neural network hardware fulfills a connectivity constraint condition of a neural network hardware basic module, and is capable of being directly mapped to the neural network hardware basic module; and a basic unit hardware network connection step of connecting the obtained basic unit hardware networks according to the sequence of splitting so as to create a parameter file for the hardware neural network. The foregoing description provided in conjunction with FIG. 2 to FIG. 9 may be referred to for functions and specific implementation of the neural network connection diagram obtaining step, the neural network connection diagram splitting step, the neural network basic unit conversion step, and the basic unit hardware network connection step, which will not be repeated herein.

According to still another aspect of the present disclosure, there is provided a compiling method for compiling a neural network software application into a hardware neural network, which may comprise: obtaining a neural network software application and a neural network hardware chip configuration situation; converting the neural network software application into the hardware neural network, based on the neural network hardware configuration situation, the hardware neural network being formed by connecting basic modules of the neural network hardware chip; and outputting a parameter file for the hardware neural network, the parameter file describing a connection relationship between the basic modules and a parameter configuration situation of respective basic modules.

According a further aspect of the present disclosure, there is provided a neural network software and hardware collaboration system, which may comprise: a neural network hardware chip, wherein, the neural network hardware chip has a basic module thereon, the basic module executes a matrix vector multiplication and an activation function operation in a form of hardware, and a parameter of the basic module on the neural network hardware chip and a connection between basic modules may be configured by a configuration file of a determined format; a compiling layer unit, configured to compile a neural network application into a parameter file for a hardware neural network, wherein, the hardware neural network may be mapped to one or more neural network hardware chips based on the parameter file, and the one or more mapped neural network hardware chips are capable of running a function of the neural network application.

In the neural network software and hardware collaboration system according to the embodiment, the compiling layer unit is configured to execute a method below: a hardware configuration data obtaining step of obtaining configuration situation data of the neural network hardware chip; a neural network connection diagram obtaining step of obtaining a neural network connection diagram corresponding to the neural network application, wherein, the neural network connection diagram is a directed diagram, each node in the diagram represents a layer of neurons, and each edge represents an inter-layer connection relationship; a neural network connection diagram splitting step of splitting the neural network connection diagram into neural network basic units, wherein, each neural network basic unit has only ingress nodes and egress nodes without any intermediate layer node, the ingress nodes are in full connection with the egress nodes, all fan-outs of each neuron in the ingress node are within the basic unit, and all fan-ins of each neuron in the egress node are within the basic unit; a neural network basic unit conversion step of converting each of the neural network basic units so as to form a network having equivalent functions thereto and formed by connecting basic module virtual entities of neural network hardware, which is referred to as a basic unit hardware network, wherein, one neural network basic unit corresponds to one or more basic module virtual entities of the neural network hardware, and each basic module virtual entity of the neural network hardware fulfills a connectivity constraint condition of a neural network hardware basic module, and is able to be directly mapped to the neural network hardware basic module; and a basic unit hardware network connection step of connecting the obtained basic unit hardware networks according to the sequence of splitting so as to create a parameter file for the hardware neural network. The foregoing description provided in conjunction with FIG. 2 to FIG. 9 may be referred to for functions and specific implementation of the neural network connection diagram obtaining step, the neural network connection diagram splitting step, the neural network basic unit conversion step, and the basic unit hardware network connection step, which will not be repeated herein.

The hardware neural network conversion method, the computing device, the compiling method for compiling the neural network software application into the hardware neural network, and the neural network software and hardware collaboration system according to the present disclosure make pioneering contributions, and have outstanding technical effects.

The present disclosure provides a novel neural network and a brain-like computing software and hardware system. The addition of an intermediate compiling layer between the neural network application and the neural network chip resolves the issue of difficult adaptation between the neural network application and the neural network hardware, so that it is not necessary to limit the freedom degree and flexibility of the neural network application itself, and the performance bottleneck that the hardware brings in order to implement the freedom degree is also avoided.

Meanwhile, the present disclosure decouples the neural network application from the chip, so that it is not necessary to redevelop the neural network application for different underlying hardware; and through the present disclosure, a trained neural network may be adapted to an arbitrary neural network chip. At a same time, versatility of the neural network chip is also improved, and research and development of the neural network chip may support a new feature appearing in the application without adding a new structure.

In addition, conversion time according to the technical solution of the present disclosure is also much shorter than time for retraining the entire neural network, resulting in much higher efficiency than that of redesigning and training the neural network for the hardware.

Respective embodiments of the present disclosure provide groundbreaking technical solutions:

(1) A novel neural network and a brain-like computing software and hardware system are provided.

The existing technical route is, without exception, to directly adapt the neural network application to the chip: either directly adapt the chip to the freedom degree of the application, which brings a performance bottleneck; or expose the chip constraint to the application, which constrains capabilities of the application. In the present disclosure, the addition of an intermediate layer between the application and the chip resolves the issue by means equivalent to a compiling technology in the traditional computer system, and in the meantime, decouples applications from chip development.

(2) A neural network application conversion (compilation) algorithm process is provided.

With respect to an arbitrary complex neural network and arbitrary hardware fulfilling hardware abstraction, a universal process is provided herein, which may convert the complex neural network into a specific network fulfilling the hardware constraint condition, and having substantially equivalent functions to the original network. The core of the process is to decompose the complex network; since an operation executed by each basic unit is relatively simple, the conversion process may be more securely converged than direct conversion of the entire network, with a faster convergence speed. At a same time, modules are converted one by one in the topological order, and the previously generated error is introduced into subsequent fine adjustment, so that the error introduced by conversion of the respective basic modules will not be accumulated layer by layer.

(3) A universal neural network splitting algorithm is provided.

The nodes in the neural network connection diagram are grouped, and the neural network is split into a plurality of basic units, so that ingress edges or egress edges of an arbitrary node within the basic unit are all within the basic unit, and thus, after the issue of connectivity is resolved within the basic unit, the converted basic units are reconnected, and the obtained network still can fulfill the connectivity requirement.

(4) A network compression algorithm for the convolutional neural network is provided.

In a specific embodiment, through extension of the prior art solution, the highest diversity feature map subset in each layer of the convolutional neural network is selected by using the method of DPP for extracting the diversity subset, and the remaining feature map node is discarded, so as to effectively trim the size of the network. Moreover, influence on network precision is lowered in a mode of projection and fine adjustment. Through this method, redundancy in the network may be effectively removed, and occupation of hardware resources is reduced.

(5) A universal neural network conversion algorithm is provided.

According to a specific embodiment, a hardware neural network with a more complex topology and a stronger capability is constructed through topology reconstruction. Its technical core includes: hardware precision encoding implemented with the autoencoder, to resolve the hardware precision constraint; special function processing, to resolve the constraint of the hardware activation function or the neuron model; and fully expansion, to resolve the hardware connectivity constraint.

Further, in a specific embodiment, the hardware neural network is made to approximate to the function of the original neural network through multiple weight fine adjustments. Its core technology includes weight setting based on the EM algorithm and the low-precision training method.

The technology according to the present disclosure is a universal application network conversion algorithm, which is applicable to processing of various neural networks, for example, ANN, SNN, RNN, and the like.

It should be noted that, the respective steps are shown in a certain order in the accompanying drawings, which does not imply that these steps may only be executed in the order displayed or described, and the steps may be executed in an order different from the order displayed unless there is a logical contradiction.

The descriptions of the respective embodiments of the present disclosure have been presented for purposes of illustration, but are not intended to be exhaustive or limited to the respective embodiments disclosed. Many modifications and variations will be apparent to those of ordinary skill in the art without departing from the scope and spirit of the described respective embodiments. Therefore, the scope of the present disclosure should be the scope of the following claims.

The invention claimed is:

1. A hardware neural network conversion method for converting a neural network application into a hardware neural network fulfilling a hardware constraint condition, comprising:
a neural network connection diagram obtaining step of obtaining a neural network connection diagram corresponding to the neural network application, wherein, the neural network connection diagram is a directed diagram, each node in the diagram represents a layer of neurons from the neural network application and each edge represents an inter-layer connection relationship;

a neural network connection diagram splitting step of splitting the neural network connection diagram into neural network basic units, wherein each neural network basic unit has only ingress nodes and egress nodes without any intermediate layer node, the ingress nodes are in full connection with the egress nodes, all fan-outs of each neuron in the ingress node are within the basic unit, and all fan-ins of each neuron in the egress node are within the basic unit;

a neural network basic unit conversion step of:
  converting each of the neural network basic units into a basic unit hardware network having equivalent functions thereto and formed by connecting basic module virtual entities of neural network hardware, wherein one neural network basic unit corresponds to one or more basic module virtual entities of the neural network hardware, and each basic module virtual entity of the neural network hardware (1) fulfills a connectivity constraint condition of a neural network hardware basic module and (2) is capable of being directly mapped to a neural network hardware basic module; and
reconstructing a network topology for each neural network basic unit, including:
  recoding inter-layer data with an autoencoder, the autoencoder being a neural network consisting of three layers of neurons including an input layer, a hidden layer and an output layer, a number of nodes of the output layer being equal to a number of nodes of the input layer, and a number of nodes of the hidden layer being greater than a dimensionality of inter-layer vector data;
  training the network by reducing an error between a value of the output layer and a value of the input layer below a predetermined threshold, wherein precision of the input layer and the output layer is precision of the neural network application, and precision of the hidden layer is precision of data transmitted between the neural network hardware basic modules;
  converting the autoencoder into a combination of an encoder and a decoder; and
  forming a connection matrix by combining a decoder of an input node, a weight matrix of a connection of the neural network application, and an encoder of an output node, with respect to an expression that an inter-layer vector transmitted from a Kth layer to a (K+1)th layer is a hidden layer of the autoencoder used in the Kth layer, and
  performing a fully expanded operation which decomposes the neural network basic unit into interconnections between basic module virtual entities;
  determining a weight parameter for the reconstructed network topology, including:
  initializing a weight of the network obtained by reconstructing the network topology, according to a weight of the neural network application; and
  performing adjustment on the weight parameter such that the weight fulfills a hardware weight constraint;
wherein when there is a special function in the neural network application and a neural network hardware chip does not support the special function, before the fully expanded operation, constructing a specialized neural network for the special function; and a basic unit hardware network connection step of connecting the obtained basic unit hardware networks according to a sequence of splitting in order to create a parameter file for the hardware neural network.

2. The hardware neural network conversion method according to claim 1, further comprising: when the neural network application has a convolution layer, before the neural network connection diagram splitting step, performing network compression on the convolution layer of the neural network application, including:
  obtaining a plurality of feature maps of each convolution layer; and
  taking similarity between outputs generated by the feature maps on all samples as a determinantal point process (DPP) algorithm-associated matrix element by using a DPP method of: extracting a diversity subset, obtaining a highest diversity subset by using the DPP, reserving the subset, discarding other feature map nodes, projecting a vector corresponding to the discarded feature map into a linear space spanned by the reserved feature map, taking a ratio of a projection length of the discarded feature map to its original vector length as a weighting coefficient, and accumulating a connection weight between the discarded feature map and a next layer of neurons in a weighted manner onto a connection weight between the reserved feature map and the next layer of neurons.

3. The hardware neural network conversion method according to claim 1, wherein, the fully expanded operation includes:
  when a first-size matrix operation associated with the neural network basic unit exceeds a second-size matrix operation supported by the neural network hardware basic module, executing operations below, wherein a size of the first-size matrix operation exceeds a second predefined threshold, and a size of the second-size matrix operation is less than the second predefined threshold:
  splitting the first-size matrix operation into a predetermined number of second-size small matrix operations, each second-size matrix operation being completed by one basic module virtual entity;
  decomposing input data for the first-size matrix operation into the predetermined number of copies, and transmitting the predetermined number of copies to the predetermined number of second-size matrix operations, which is a multicast operation;
  aggregating operation results from the predetermined number of second-size matrix operations to be equivalent to an operation result of the first-size matrix operation, which is a reduction operation;
  when the neural network hardware chip has a first additional module supporting the multicast operation, assigning the multicast operation to be executed by a virtual entity of the first additional module; otherwise, completing the multicast operation by a first set of virtual entities of basic modules; and
  when the neural network hardware chip has a second additional module supporting the reduction operation, assigning the reduction operation to be executed by a virtual entity of the second additional module virtual entity; otherwise, completing the reduction operation by a second set of virtual entities of basic modules.

4. The hardware neural network conversion method according to claim 3, wherein, when a number of basic modules on a neural network hardware chip is less than a third predetermined threshold, a basic module is multiplexed in a time division manner.

5. The hardware neural network conversion method according to claim 1, wherein, the performing adjustment on the weight parameter such that the weight fulfills a hardware weight constraint, includes:
  (1) firstly, expressing the weight with floating point precision, and retraining the constructed network, so that an error of the constructed network from the original network is below a second predetermined threshold;
  (2) when a neural network hardware chip has a configurable parameter P, determining P and $k_{ij}$ satisfying a condition in an Expectation Maximization (EM) algorithm, according to the parameter obtained in the retraining of step (1), wherein all weight parameters are expressed as a function of P, and are retrained to adjust P, where P is a configurable parameter of hardware abstraction, and $k_{ij}$ is an index of values of respective matrix elements in a set $S^P$;
  (3) when weight precision of the neural network hardware chip is lower than the second predetermined threshold, fixing P obtained in step (2), initializing all weights to corresponding $S_{k_{ij}}^P$, retraining to adjust $k_{ij}$, storing all the weights with floating point precision, but rounding all the weight parameters to a most approximate value in $S^P$ in a feedforward process of the training, then bringing all the weight parameters into feedforward computation, and still using floating point precision while feeding back and updating the weights, and updating weight values of floating point precision,
  where, a value range of a weight matrix W of the neural network hardware basic module is considered as a set $S^P$, each element in the set is a function of parameter P, where P is a hardware configurable parameter, each element $W_{ij}$ in the weight matrix is capable of being independently selected from $S^P$, that is, index $k_{ij}$ is capable of being independently configured such that $W_{ij}=S_{k_{ij}}^P$, so what the weight matrix W is capable of configuring is a set parameter P and an index $k_{ij}$ of values of respective weights in the set.

6. The hardware neural network conversion method according to claim 1, wherein, the converting each of the neural network basic units into a network having equivalent functions thereto and formed by connecting basic module virtual entities of neural network hardware includes:
  in a case where the neural network connection diagram is a directed acyclic diagram, converting the respective neural network basic units one by one, in a topological order of the neural network connection diagram;
  in a case where the neural network connection diagram is a cyclic directed diagram, firstly breaking a cycle of the cyclic directed diagram, so that the neural network connection diagram is changed into a directed acyclic diagram, then converting the respective neural network basic units one by one, in a topological order of the directed acyclic diagram; and
  training the respective converted neural network basic units in the topological order, wherein training input data is an output generated by a training sample having undergone a topological order-preceded basic unit hardware network, and training output label is an output generated by the training sample in a corresponding layer of the original neural network application.

7. The hardware neural network conversion method according to claim 1, wherein, when the neural network application is a Spiking Neural Network (SNN), the training data used in the neural network basic unit conversion step is obtained as follows: taking an electrical pulse of a stable frequency as an input with respect to the original network, recording electrical pulse discharge frequencies of respective neurons, and taking the recorded electrical pulse discharge frequencies as the training data used in the neural network basic unit conversion step.

8. The hardware neural network conversion method according to claim 1, wherein, when a neural network involved in the neural network hardware chip is of a Spiking Neural Network (SNN) type, a functional relation of the SNN on the pulse discharge frequency is derived according to a neuron model of the SNN, and based on that the functional relation is continuous and derivable, training is performed by using a back-propagation algorithm.

9. A computing device, for converting a neural network application into a hardware neural network fulfilling a hardware constraint condition, comprising a memory and a processor, the memory having computer-executable instructions stored therein, and when executing the computer-executable instructions, the processor executing a method below:
  a neural network connection diagram obtaining step of obtaining a neural network connection diagram corresponding to the neural network application, wherein, the neural network connection diagram is a directed diagram, each node in the diagram represents a layer of neurons from the neural network application and each edge represents an inter-layer connection relationship;
  a neural network connection diagram splitting step of splitting the neural network connection diagram into neural network basic units, wherein each neural network basic unit has only ingress nodes and egress nodes without any intermediate layer node, the ingress nodes are in full connection with the egress nodes, all fan-outs of each neuron in the ingress node are within the basic unit, and all fan-ins of each neuron in the egress node are within the basic unit;
  a neural network basic unit conversion step of converting each of the neural network basic units so as to form a basic unit hardware network having equivalent functions thereto and formed by connecting basic module virtual entities of neural network hardware, wherein one neural network basic unit corresponds to one or more basic module virtual entities of the neural network hardware, and each basic module virtual entity of the neural network hardware (1) fulfills a connectivity constraint condition of a neural network hardware basic module and (2) is capable of being directly mapped to the neural network hardware basic module; and
  wherein, the neural network basic unit conversion step includes: reconstructing a network topology for each neural network basic unit;
  wherein, the reconstructing a network topology includes:
  recoding inter-layer data with an autoencoder, the autoencoder being a neural network consisting of three layers of neurons including an input layer, a hidden layer and an output layer, the number of nodes of the output layer being equal to a number of nodes of the input layer, and a number of nodes of the hidden layer being greater than dimensionality of inter-layer vector data;
  training the network by reducing an error between a value of the output layer and a value of the input layer below a predetermined threshold, precision of the input layer and the output layer is precision of the neural network application, and precision of the hidden layer is precision of data transmitted between the neural network hardware basic modules;

converting the autoencoder into a combination of an encoder and a decoder; and forming a connection matrix by combining a decoder of an input node, a weight matrix of a connection of the neural network application, and an encoder of an output node, with respect to an expression that an inter-layer vector transmitted from a Kth layer to a (K+1)th layer is a hidden layer of the autoencoder used in the Kth layer, performing a fully expanded operation which decomposes the neural network basic unit into interconnections between basic module virtual entities;

determining a weight parameter for the reconstructed network topology, including:
   initializing a weight of the network obtained by reconstructing the network topology, according to a weight of the neural network application; and
   performing adjustment on the weight parameter such that the weight fulfills a hardware weight constraint;

wherein when there is a special function in the neural network application and a neural network hardware chip does not support the special function, before the fully expanded operation, constructing a specialized neural network for the special function; and further comprising connecting the obtained basic unit hardware networks according to a sequence of splitting in order to create a parameter file for the hardware neural network.

10. The computing device according to claim 9, the method executed further comprising: when the neural network application has a convolution layer, before the neural network connection diagram splitting step, performing network compression on the convolution layer of the neural network application, including:
   obtaining a plurality of feature maps of each convolution layer; and
   taking similarity between outputs generated by the feature maps on all samples as a determinantal point process (DPP) algorithm-associated matrix element by using a DPP method of: extracting a diversity subset, obtaining a highest diversity subset by using the DPP, reserving the subset, discarding other feature map nodes, projecting a vector corresponding to the discarded feature map into a linear space spanned by the reserved feature map, taking a ratio of a projection length of the discarded feature map to its original vector length as a weighting coefficient, and accumulating a connection weight between the discarded feature map and a next layer of neurons in a weighted manner onto a connection weight between the reserved feature map and the next layer of neurons.

11. The computing device according to claim 9, wherein, the fully expanded operation includes:
   when a first-size matrix multiplication and/or a matrix convolution operation associated with the neural network basic unit exceeds a second-size matrix operation supported by the neural network hardware basic module, executing operations below, wherein a size of the first-size matrix operation exceeds a second predefined threshold, and a size of the second-size matrix operation is less than the second predefined threshold:
   splitting the first-size matrix operation into the predetermined number of second-size matrix operations, each second-size matrix operation being completed by one basic module virtual entity;
   decomposing input data for the first-size matrix operation into the predetermined number of copies, and transmitting the predetermined number of copies to the predetermined number of second-size matrix operations, which is a multicast operation;
   aggregating operation results from the predetermined number of second-size matrix operations to be equivalent to an operation result of the first-size matrix operation, which is a reduction operation;
      when the neural network hardware chip has a first additional module supporting the multicast operation, assigning the multicast operation to be executed by a virtual entity of the first additional module virtual entity; otherwise, completing the multicast operation by a first set of virtual entities of basic modules; and
      when the neural network hardware chip has a second additional module supporting the reduction operation, assigning the reduction operation to be executed by a virtual entity of the second additional module virtual entity; otherwise, completing the reduction operation by a second set of virtual entities of basic modules.

12. A compiling method for compiling a neural network software application into a hardware neural network, comprising:
   obtaining a neural network software application and a neural network hardware chip configuration situation;
   converting the neural network software application into the hardware neural network, based on the neural network hardware chip configuration situation, the hardware neural network being formed by connecting basic modules of the neural network hardware chip; and
   outputting a parameter file for the hardware neural network, the parameter file describing a connection relationship between the basic modules and a parameter configuration situation of respective basic modules,
   wherein converting the neural network software application into the hardware neural network comprises:
   a neural network connection diagram obtaining step of obtaining a neural network connection diagram corresponding to the neural network application, wherein, the neural network connection diagram is a directed diagram, each node in the diagram represents a layer of neurons from the neural network application and each edge represents an inter-layer connection relationship;
   a neural network connection diagram splitting step of splitting the neural network connection diagram into neural network basic units, wherein each neural network basic unit has only ingress nodes and egress nodes without any intermediate layer node, the ingress nodes are in full connection with the egress nodes, all fan-outs of each neuron in the ingress node are within the basic unit, and all fan-ins of each neuron in the egress node are within the basic unit;
   a neural network basic unit conversion step of converting each of the neural network basic units into a basic unit hardware network having equivalent functions thereto and formed by connecting basic module virtual entities of neural network hardware, wherein one neural network basic unit corresponds to one or more basic module virtual entities of the neural network hardware, and each basic module virtual entity of the neural network hardware (1) fulfills a connectivity constraint condition of a neural network hardware basic module and (2) is capable of being directly mapped to a neural network hardware basic module; and wherein, the neural network basic unit conversion step includes: reconstructing a network topology for each neural network basic unit;

wherein, the reconstructing a network topology includes:

recoding inter-layer data with an autoencoder, the autoencoder being a neural network consisting of three layers of neurons including an input layer, a hidden layer and an output layer, a number of nodes of the output layer being equal to a number of nodes of the input layer, and a number of nodes of the hidden layer being greater than a dimensionality of inter-layer vector data;

training the network by reducing an error between a value of the output layer and a value of the input layer below a predetermined threshold, wherein precision of the input layer and the output layer being precision of the neural network application, and precision of the hidden layer being precision of data transmitted between the neural network hardware basic modules;

converting the autoencoder into a combination of an encoder and a decoder; and forming a connection matrix by combining a decoder of an input node, a weight matrix of a connection of the neural network application, and an encoder of an output node, with respect to an expression that an inter-layer vector transmitted from a Kth layer to a (K+1)th layer is a hidden layer of the autoencoder used in the Kth layer, performing a fully expanded operation which decomposes the neural network basic unit into interconnections between basic module virtual entities;

determining a weight parameter for the reconstructed network topology, including:

initializing a weight of the network obtained by reconstructing the network topology, according to a weight of the neural network application; and performing adjustment on the weight parameter such that the weight fulfills a hardware weight constraint;

wherein when there is a special function in the neural network application and a neural network hardware chip does not support the special function, before the fully expanded operation, constructing a specialized neural network for the special function; and connecting the obtained basic unit hardware networks according to a sequence of splitting in order to create a parameter file for the hardware neural network.

13. A neural network software and hardware collaboration system, comprising:

a neural network hardware chip, wherein, the neural network hardware chip has a basic module thereon, the basic module executes a matrix vector multiplication and an activation function operation in a form of hardware, and a parameter of the basic module on the neural network hardware chip and a connection between basic modules are capable of being configured by a configuration file of a determined format;

a compiling layer unit, configured to compile a neural network application into a parameter file for a hardware neural network, wherein, the hardware neural network is capable of being mapped to one or more neural network hardware chips based on the parameter file, and the one or more mapped neural network hardware chips are capable of running a function of the neural network application, the compiling layer unit being configured to execute a method below:

a hardware configuration data obtaining step of obtaining configuration situation data of the neural network hardware chip;

a neural network connection diagram obtaining step of obtaining a neural network connection diagram corresponding to the neural network application, wherein, the neural network connection diagram is a directed diagram, each node in the diagram represents a layer of neurons from the neural network application and each edge represents an inter-layer connection relationship;

a neural network connection diagram splitting step of splitting the neural network connection diagram into neural network basic units, wherein each neural network basic unit has only ingress nodes and egress nodes without any intermediate layer node, the ingress nodes are in full connection with the egress nodes, all fan-outs of each neuron in the ingress node are within the basic unit, and all fan-ins of each neuron in the egress node are within the basic unit;

a neural network basic unit conversion step of converting each of the neural network basic units so as to form a basic unit hardware network having equivalent functions thereto and formed by connecting basic module virtual entities of neural network hardware, wherein one neural network basic unit corresponds to one or more basic module virtual entities of the neural network hardware, and each basic module virtual entity of the neural network hardware (1) fulfills a connectivity constraint condition of a neural network hardware basic module and (2) is capable of be directly mapped to the neural network hardware basic module; and wherein the neural network basic unit conversion step includes: reconstructing a network topology for each neural network basic unit;

wherein the reconstructing a network topology includes:

recoding inter-layer data with an autoencoder, the autoencoder being a neural network consisting of three layers of neurons including an input layer, a hidden layer and an output layer, a number of nodes of the output layer being equal to a number of nodes of the input layer, and a number of nodes of the hidden layer being greater than dimensionality of inter-layer vector data;

training the network by reducing an error between a value of the output layer and a value of the input layer below a predetermined threshold, precision of the input layer and the output layer being precision of the neural network application, and precision of the hidden layer being precision of data transmitted between the neural network hardware basic modules;

converting the autoencoder into a combination of an encoder and a decoder; and forming a connection matrix by combining a decoder of an input node, a weight matrix of a connection of the neural network application, and an encoder of an output node, with respect to an expression that an inter-layer vector transmitted from a Kth layer to a (K+1)th layer is a hidden layer of the autoencoder used in the Kth layer, performing a fully expanded operation which decomposes the neural network basic unit into interconnections between basic module virtual entities;

determining a weight parameter for the reconstructed network topology, including:

initializing a weight of the network obtained by reconstructing the network topology, according to a weight of the neural network application; and performing adjustment on the weight parameter such that the weight fulfills a hardware weight constraint;

wherein when there is a special function in the neural network application and a neural network hardware chip does not support the special function, before the fully expanded operation, constructing a specialized neural network for the special function; and a basic unit hardware network connection step of connecting the obtained basic unit hardware networks according to a sequence of splitting in order to create a parameter file for the hardware neural network.

* * * * *